United States Patent
Feinbloom et al.

(10) Patent No.: US 10,782,599 B1
(45) Date of Patent: Sep. 22, 2020

(54) LED LIGHT BLENDING ASSEMBLY

(71) Applicant: Designs for Vision, Inc., Bohemia, NY (US)

(72) Inventors: Richard E. Feinbloom, New York, NY (US); Ken Braganca, Sayville, NY (US); Kenneth Koscheka, Wading River, NY (US)

(73) Assignee: DESIGNS FOR VISION, INC., Bohemia, NY (US)

( * ) Notice: Subject to any disclaimer, the term of this patent is extended or adjusted under 35 U.S.C. 154(b) by 0 days.

(21) Appl. No.: 15/892,396

(22) Filed: Feb. 8, 2018

Related U.S. Application Data

(60) Provisional application No. 62/569,331, filed on Oct. 6, 2017, provisional application No. 62/459,541, filed on Feb. 15, 2017.

(51) Int. Cl.

| | | |
|---|---|---|
| *G03B 21/20* | (2006.01) | |
| *G02B 27/09* | (2006.01) | |
| *F21S 10/02* | (2006.01) | |
| *H05B 45/20* | (2020.01) | |

(52) U.S. Cl.
CPC .......... *G03B 21/2013* (2013.01); *F21S 10/02* (2013.01); *G02B 27/0955* (2013.01); *G03B 21/2033* (2013.01); *H05B 45/20* (2020.01)

(58) Field of Classification Search
CPC ....... F21V 14/02; F21V 14/025; B06B 1/166; G03B 21/2046; G03B 21/2033; G03B 21/2013; G03B 21/2006; G03B 21/206; G03B 21/2053; G03B 2205/0069; G03B 21/00–64; F21S 41/657; B60Q 1/2696; G02F 1/133608; G02F 1/133611; H04N 9/312; H04N 9/3138; H04N 9/3155; H04N 9/3161; H04N 9/3164; H04N 9/31–3197; F21Y 2115/00; F21Y 2115/10

See application file for complete search history.

(56) References Cited

U.S. PATENT DOCUMENTS

| | | | |
|---|---|---|---|
| 6,879,067 B1 * | 4/2005 | Rockwell ............... | H02K 33/04 310/12.04 |
| 7,690,806 B2 | 4/2010 | Feinbloom | |
| 8,215,791 B2 | 7/2012 | Feinbloom | |
| 8,851,709 B2 | 10/2014 | Feinbloom | |
| RE46,463 E | 7/2017 | Feinbloom | |
| 2004/0226475 A1 * | 11/2004 | Chen ....................... | B60L 13/10 104/283 |
| 2005/0062937 A1 * | 3/2005 | Imade ..................... | F21S 6/003 353/31 |
| 2009/0323341 A1 * | 12/2009 | Chui ..................... | G09G 3/3406 362/249.02 |
| 2013/0057834 A1 * | 3/2013 | Yoshida ................. | B23P 11/00 353/38 |
| 2015/0138770 A1 * | 5/2015 | Kwak ....................... | F21V 5/04 362/244 |
| 2015/0345733 A1 * | 12/2015 | Bobbo .................... | F21V 17/10 362/375 |

(Continued)

*Primary Examiner* — Michelle M Iacoletti
*Assistant Examiner* — Christopher A Lamb, II
(74) *Attorney, Agent, or Firm* — Office of Carl A. Giordano, PC

(57) ABSTRACT

Disclosed is a lighting assembly including a plurality of Light Emitting Diodes (LEDs) for providing a projection of a substantially uniform light at a working distance from the lighting assembly by oscillating the included plurality of LEDs.

18 Claims, 17 Drawing Sheets

(56) References Cited

U.S. PATENT DOCUMENTS

| | | | |
|---|---|---|---|
| 2016/0381749 A1* | 12/2016 | Catalano | F21S 10/00 |
| | | | 315/297 |
| 2018/0157158 A1* | 6/2018 | Yaras | G03B 21/2046 |
| 2018/0259166 A1* | 9/2018 | Min | F21K 9/00 |

* cited by examiner

410

420

430

1600

1700

1800

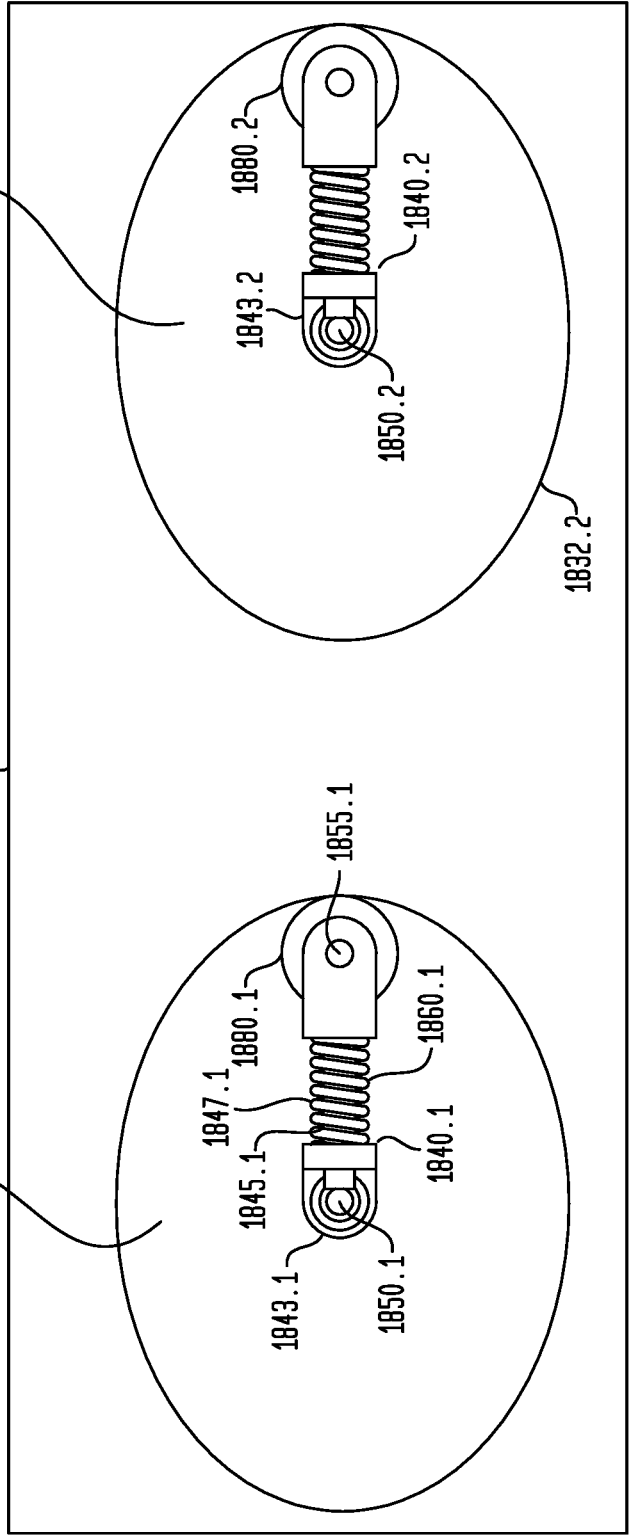

LED LIGHT BLENDING ASSEMBLY

CLAIM OF PRIORITY

This application claims pursuant to 35 USC 119, as a non-provisional application, priority to and the benefit of the earlier filing dates of provisional patent application Ser. No. 62/569,331 filed on Oct. 6, 2017 and Ser. No. 62/459,541 filed on Feb. 15, 2017, the contents of all of which are incorporated by reference, herein.

RELATED APPLICATIONS

This application is related to, and incorporates by reference, herein, the teaching of U.S. Pat. No. 7,690,806, which is assigned to the Assignee of the instant application.

FIELD OF THE INVENTION

The instant application relates to the field of optics and more particularly to an illuminating device providing a substantially uniform light distribution and/or wide range of color temperatures from a plurality of light emitting diodes (LEDs).

BACKGROUND OF THE INVENTION

Illumination devices are employed in a wide variety of fields and applications. New LED technology has spurred the growth of the applications of LEDs in numerous fields. From flashlights, automotive headlights to general house lighting, LEDs are being utilized to replace existing incandescent and/or halogen lighting.

LEDs generally have a longer operational life, require less power and generate less heat.

In a conventional configuration, LEDs are arranged in an array of LEDs as typical LED size is in the order of a 6×6 mm shape to provide for a large field of illumination. The larger the array (i.e., the number of incorporated LEDs) the brighter the output and the larger field of view.

However, to increase the light output of the LEDs, either larger LED packages or the application of a greater power to conventional LED packages is necessary. However, increasing the size of the LED is limited by the LED manufacturing process, while increasing the power provided to the LED packages increases the heat generated by the LEDs. Both options are thus not desirable.

Hence, there is a need for a low-cost illumination device that is suitable for projecting a substantially uniform bright light onto a desired location with a desired intensity and/or color.

SUMMARY OF THE INVENTION

Disclosed is a new and inventive assembly suitable for projecting a substantially uniform light onto a surface a known distance from the assembly by oscillating a plurality of LEDs and/or LED arrays to blur and blend the light output of the LEDs and/or LED arrays.

In one aspect of the invention, oscillation or movement of the LEDs and/or LED arrays, provides for a brighter, substantially uniform, light at a known distance from the LED light source.

In another aspect of the invention, the oscillation or movement of the LEDs and/or LED arrays provides for the projection of the light emitted by LEDs of a same color (e.g., all white) or different colors (e.g. red, green, blue) or of different color temperatures (e.g., cool, warm) at a known distance from the LEDs. Accordingly, the light, expressed as color temperature, may be projected onto the surface based on at least one of the color and the temperature of the LEDs and/or LED arrays.

In one aspect of the invention, by the appropriate mixing of cool (i.e., 6500° K) and warm (i.e., 2700° K) LEDs/LED arrays, the perceived light at the surface may be viewed with one or more different colors ranging between bright white and soft white.

In another aspect of the invention, an apparatus for utilizing vibration (or oscillation or movement) to mix the light output of LEDs of various color temperature to produce a substantially uniform light with a proper level of illumination, is disclosed. The apparatus comprises a printed circuit board populated with LEDs (or LED arrays) having a same color (e.g., white, red, blue, green) or a mix of colors (e.g., red, green, blue) or a same color temperature (all cool, all warm) or different color temperature fixed to a movable plate (e.g., mixture of cool and warm). The movable plate is mated to a mounting assembly, which is affixed (through appropriate gearing) to a motor or other means for causing movement (e.g., electromechanical, magnetic).

In another aspect of the invention, an apparatus for utilizing vibration (or oscillation, movement) to mix the light output of LEDs of a same color temperature or different color or color temperature to produce a substantially uniform light with a desired level of illumination and color is disclosed. The apparatus comprises a printed circuit board populated with LEDs having one of: a same color and a different color temperature, two magnets, one of which is fixed while the other is attached to a movable plate. The movable plate is mounted on a mounting assembly that allows for the movement of the movable plate. An oscillating current circuit, such as an H-bridge driver, provides for the alteration of the magnetic field of one of the two magnets such that the magnets attract and repel one another.

In another aspect of the invention, an apparatus for rotating a plurality of LEDs having a same or different color or color temperature to mix or blend the light output of the LEDs to produce a substantially uniform light with a desired level of illumination and color is disclosed.

In accordance with the principles of the invention, the apparatus comprises a printed circuit board populated with LEDs (LED arrays) of a same color or color temperatures (e.g., warm 2700-3500° K and cool 5500-6500° K) or of different colors (i.e., white, red, green, blue) or different color temperatures (e.g., warm 2700° K and cool 6500° K) attached to a mounting plate. The mounting plate is attached to a means for causing the oscillation or movement of LEDs 110.1 . . . 110.*n*.

The light generated by the oscillating (vibrating or moving) LEDs is then projected by optics to display the blended light onto a working field a known distance from the light source (e.g., LEDs 110.1 . . . 110.*n*).

In another aspect of the invention, an apparatus for driving a plurality of LEDs having a same or different color or color temperature to mix or blend the light output of the LEDs to produce a substantially uniform light with a desired level of illumination and color is disclosed. In accordance with the principles of the invention, the apparatus comprises a printed circuit board populated with LEDs (LED arrays) of the same or of different or color temperatures (e.g., warm 2700° K and cool 6500° K) or of different colors (i.e., white, red, green, blue) fixed to a mounting plate. The mounting plate is attached to a means for driving the LEDS in a known pattern.

BRIEF DESCRIPTION OF THE FIGURES

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 19 illustrates a top view of an exemplary oscillating platform shown in FIG. 18 in accordance with the principles of the invention.

It is to be understood that the figures and descriptions of the present invention described herein have been simplified, and not drawn to scale, to illustrate the elements that are relevant for a clear understanding of the present invention, while eliminating, for purposes of clarity many other elements. However, because these omitted elements are well-known in the art, and because they do not facilitate a better understanding of the present invention, a discussion of such element is not provided herein. The disclosure herein is directed to also variations and modifications known to those skilled in the art.

DETAILED DESCRIPTION

Figure 1:
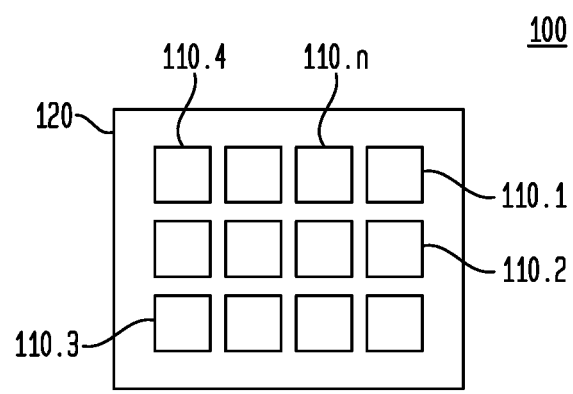
FIG. 1 illustrates a conventional arrangement of a plurality of Light Emitting Diodes (LEDs).

FIG. 1 illustrates an exemplary conventional arrangement 100 of a plurality of Light Emitting Diodes 110.1, 110.2, 110.3, 110.4 . . . 110.$n$ into a matrix or array of 3 rows of 4 (columns) of LEDs.

Although a matrix array of 3 rows×4 columns is shown, it would be appreciated that other combinations of LED arrangements (e.g., N×M arrays, circular, etc.) are well-known in the art and considered within the scope of the invention claimed. Accordingly, the arrangement shown in FIG. 1 is presented to illustrate the operation of the invention claimed and is not the only configuration considered.

LED array 100 shown in FIG. 1 may represent a single LED comprising a plurality of LEDs, wherein the plurality of LEDs are arranged in a matrix configuration. Hence, while 12 LEDs 110.1 . . . 110.$n$ are illustrated in FIG. 1, it would be understood that each of these 12 LEDs may represent a plurality of LEDs and an actual number of LEDs utilized may be significantly greater than that shown in FIG. 1.

The LED array 100 composed of the exemplary 12 LEDs 110.1 . . . 110.$n$, may be of a same color (e.g., white) or different colors (e.g., white, red, green, blue). Alternatively, the LEDs 110.1 . . . 110.$n$ may be selected to output different color temperatures (e.g., warm/cool).

LED array 100 is conventionally attached to a printed circuit board (PCB) 120, which includes electronic circuitry (resistors, capacitors, switches, programmable gate arrays, application specific integrated circuits, designated integrated circuits, etc.) (not shown) that control a flow of electrical energy to corresponding ones of LEDs. 110.1 . . . 110.$n$. PCB 120 may include a microprocessor or dedicated hardware (e.g., Application Specific Integrated Circuitry, ASIC) (not shown), that may be programmed to control at least a rate and/or a sequence of the application of a voltage/current to a corresponding one of the plurality of LEDs (e.g., turning on/off of one or more of the LEDs).

In addition, microprocessor/hardware (not shown) may also control a level of voltage (or current) applied to one or more of the LEDs 110.1 ... 110.n in array 100, such that different levels of light output from a corresponding LED may be achieved. For example, by applying different voltage levels to corresponding red, green and blue LEDs, the outputted light color may be a color that is neither red, green nor blue. Rather the color is a blend of the outputs of the different outputted colors.

The referred-to electronic circuitry elements incorporated onto the PCB 120 are well-known and a detailed discussion of the nature and operation of these elements is within the knowledge of those skilled in the art. Accordingly, a detailed description of the operation of programmable circuitry or the programming of such circuitry is not believed necessary.

Figure 2A:
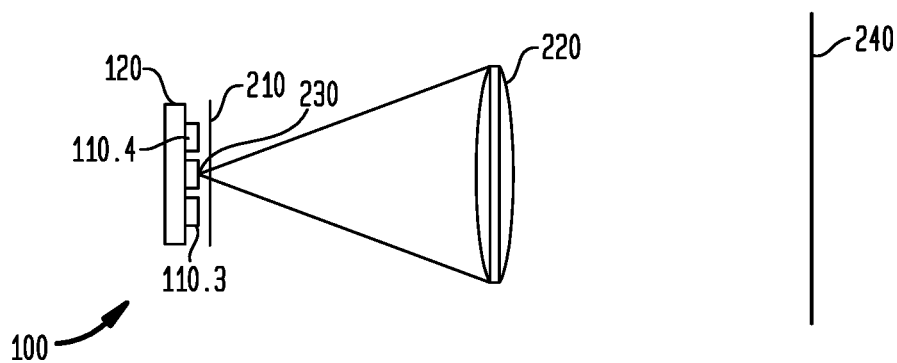
FIG. 2A illustrates a side-view of a conventional mounting of the plurality of LEDs shown in FIG. 1.

FIG. 2A illustrates a side view of array 100 wherein the light generated by LEDs 110.1 ... 110.n are passed through aperture 210 onto lens 220. In this illustrated conventional configuration, array 100 is positioned at a focal point 230 of lens 220 to focus the light onto surface 240.

In this exemplary conventional configuration, light generated (or projected) by LEDs 110.1 ... 110.n is passed through aperture 210 to remove stray light generated from the LEDs from being seen by projection lens 220. Aperture 210 is utilized to reduce the amount of stray light that is outputted by the LEDs 110.1 ... 110.n.

Projection lens 220 projects the outputted light onto a surface 240.

Figure 2B:
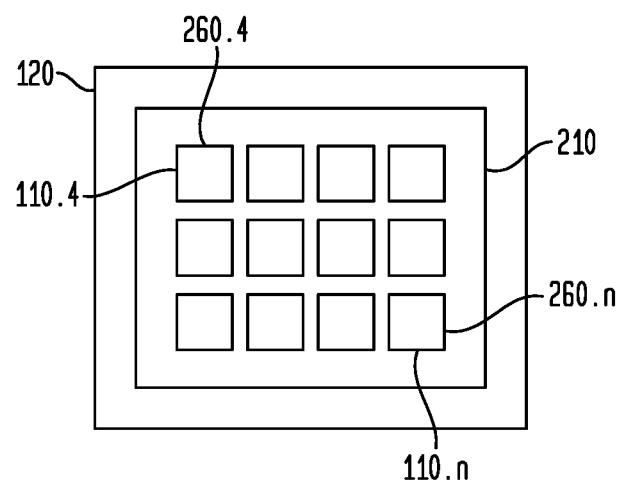
FIG. 2B illustrates a front view of an exemplary aperture in accordance with the principles of the invention.

FIG. 2B illustrates a front view of conventional aperture 210 that is commensurate with the exemplary LED array shown in FIG. 1. In this illustrated example, aperture 210 is constructed of a material (e.g., metallic, plastic, etc.) including 12 windows or openings 260.1 ... 260.n oriented in an array. Each of the windows 260.1 ... 260.n is comparable in size to a corresponding one of 12 LEDs 110.1 ... 110.n of array 100 shown in FIG. 1.

In this illustrated exemplary aperture 210, when placed on, or in close proximity to, LED array 100 on PCB 120 shown in FIG. 1, aperture 210 blocks the output of spurious light from LEDs 110.1 ... 110.n in array 100 from reaching projection lens 220. Aperture 210 and LED array 100 may or may not be in physical contact with one another.

In this illustrated example, when the light of the individual LEDs 110.1 ... 110.n is passed through aperture 210 onto lens 220, lens 220 projects the received light onto surface 240 (FIG. 2A), which is a known distance from LEDs 110.1 ... 110.n.

Figure 2C:
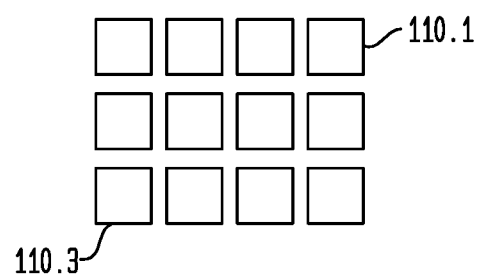
FIG. 2C illustrates an exemplary image of the light generated by the plurality of LEDs shown in FIG. 1 when projected onto a working surface using the conventional mounting configuration shown in FIG. 2A.

FIG. 2C illustrates an exemplary image associated with the projection of the light from LEDs 110.1 ... 110.n) onto surface 240. As shown, the projected image shows on outline of each of the individual LED elements 110.1 ... 110.n as projection lens 220 captures exactly the light from the individual LEDs 110.1 ... 110.n. Hence, each individual LED 110.1 ... 110.n is discernible in the projected image.

As shown, the light projected onto surface 240 by LED array 100 is not substantially uniform as the image of the individual LEDs 110.1 ... 110.n is distinctly shown in the projected light.

Figure 3:
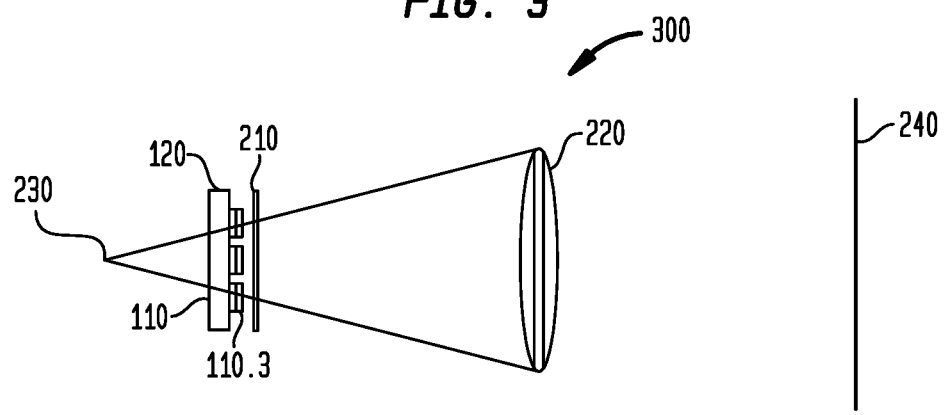
FIG. 3 illustrates a side-view of an exemplary second mounting of the plurality of LEDs shown in FIG. 1.

FIG. 3 illustrates a second exemplary convention LED configuration, similar to that disclosed in at least U.S. Pat. No. 7,690,806, and its progeny, which are assigned to the Assignee of the instant application, and whose contents are incorporated by reference, herein.

In this second exemplary configuration LED array 100 is positioned on PCB 120 and is positioned before the focal point 230 of lens 220. In this second exemplary configuration, the light generated by LED array is de-focused such that the light projected onto surface 240) fails to show the outline of the individual LEDs 110.1 ... 110n.

Hence, the light projected onto the surface is substantially uniformly distributed as the edges of the individual LEDs are blurred by the de-focusing of the light generated by LEDs 110.1 ... 110.n.

In accordance with the principles of the instant invention, to further create a substantially uniform distribution of light from the plurality of LEDs 110.1 ... 110.n, on PCB 120 is mounted on a movable guide. As will be explained, the movement of the LEDs 110.1 ... 110.n causes the light projected onto surface 240 to be further blended to blur the distinct outlines of the LEDs 110.1 ... 110.n.

Figure 4A:
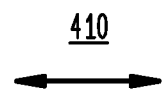
FIGS. 4A-4C illustrate exemplary oscillating movements in accordance with the principles of the invention.
Figure 4B:
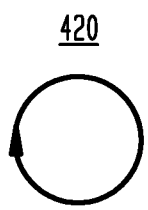
Figure 4C:
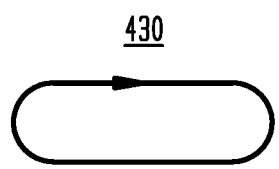

FIGS. 4A-4C illustrate exemplary oscillations or movements of the LED array 100 in accordance with the principles of the invention.

FIG. 4A illustrates an oscillation of LED array 100 having a linear movement (e.g., back and forth) 410. Alternatively, the linear movement may be vertical (e.g., up and down) or diagonally.

FIG. 4B illustrates an oscillation of LED array 100 having a clockwise circular motion 420. Alternatively, the motion may be in a counterclockwise direction.

FIG. 4C illustrates an exemplary elliptical (or racetrack) oscillation 430 of LED array 100 in accordance with the principles of the invention.

Although a horizontal, clockwise racetrack oscillation is shown, it would be recognized that the oscillation of the LED array 100 may be linear, counter-clockwise or linear (i.e., vertical) clockwise and/or counter-clockwise or diagonal clockwise and/or counter-clockwise.

In accordance with the principles of the invention, when light projected by each of the LEDs 110.1 ... 110.n, is viewed by a person, the image is perceived as a single, uniformly distributed, light output.

Figure 5:
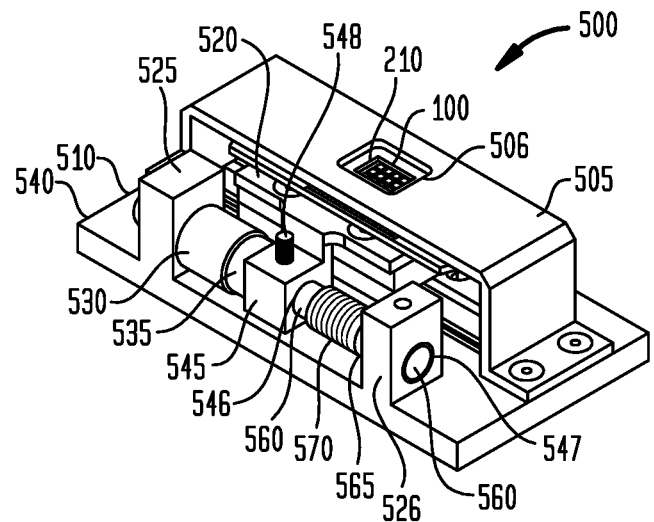
FIG. 5 illustrates a prospective view of one aspect of a first embodiment of an exemplary oscillating platform in accordance with the principles of the invention.

FIG. 5 illustrates a prospective view 500 of a platform 510 for causing movement of LED array 100, in accordance with a first aspect of a first exemplary embodiment of the invention.

In this illustrated embodiment, platform 510 is composed of a base element 540 and a bridge element 505. Within bridge element 505 is window 506, through which is shown is shown aperture 210 and LED array 100. Aperture 210 and LED array 100 are attached to guide element 520. Window 506 is sized to allow the viewing of LED array 100 as array 100 is oscillated or moved, in accordance with the principles of the invention.

Further illustrated are a left standoff 525 and a right standoff 526 extending from base element 540. Left standoff 525 and right standoff 526 represent support arms to allow for the movement or oscillation of LED array 100.

A magnet 530 is attached on a first (i.e., an inner surface) side of left standoff 525 and positioned substantially parallel to base element 540. Magnet 530 may be attached to left standoff 525 by inserting magnet 530 into a hole or passthrough (not shown) that is incorporated into left standoff 525. The hole (not shown) may be one of a passthrough, wherein magnet 530 passes entirely through left standoff 525 or a blind hole, wherein only a portion of magnet 530 is contained within left standoff 525. A screw (not shown), such as a set screw, may be used to retain magnet to left standoff 525. Similarly, magnet 530 may be attached to left standoff 525 by one of a snap-fit connection and a bayonet connection to the, not shown, hole. Magnet 530 may be attached to the inner surface of standoff 525 by an adhesive or similar material.

Magnet 530, as will be discussed may be a permanent magnet having a known magnetic pole (i.e., North, South). Alternatively, magnetic 530 may be an electromagnet, wherein a magnetic field generated may be one of an alternating magnetic pole. Operation of electromagnets based on an applied voltage is well known in the art and need not be discussed in detail herein.

Further shown is a guide standoff 545 positioned between left standoff 525 and right standoff 526. Guide standoff 545 includes a pass-through hole 546. Right standoff 526 includes a pass-through hole 547 substantially aligned with pass-through hole 546.

Further shown is rod 560 positioned within pass-through hole 546 in guide standoff 545 and positioned within pass-through hole 547 in right standoff 526. Rod 560 is attached to guide standoff by set screw 548. Rod 560 may be composed of a magnetic material (e.g., steel)

Guide standoff 545 is further attached to linear guide 520. In the illustrated example, standoff 545 is shown attached to linear guide 530 by screws. However, it would be recognized that linear guide 520 and guide standoff 545 may be composed of a single element that has been machined from a single material.

LED assembly 100 (and PCB 120, not shown) is attached to linear guide 520.

Further illustrated is tube element 565 extending between right standoff 526 and guide standoff 545. Tube element 565 is in a cylindrical relationship with rod 560, wherein rod 560 is contained within tube element 565. In this arrangement rod 560 slides, freely, within tube element 565. Further illustrated is coil element 570 surrounding, or wound around, tube element 565.

In accordance with the principles of the invention, a varying electrical energy (e.g., AC or chopped DC) applied through coil element 570 causes a magnetic field to be generated within tube element 565. The generated magnetic field magnetizes rod 560 such that one end (e.g., that end closest to magnet 530) of rod 560 experiences a first of two known magnetic polarities (i.e., North or South) while the other end (i.e., the second end) of rod 560 experiences a second of the two known magnetic polarities (i.e., South and a North). The specific polarity or "pole" of rod 560 is determined based on the polarity of the application of electrical energy to coil element 570.

As the magnetic pole of first end of rod 560 varies between North and South, the first end of rod 560 is either attracted to, or repealed from, magnet 530.

The alteration of the magnetic pole of the first end of rod 560 causes guiding element 545 to alter its position on base element 540 as rod 560 is attached to guiding element 545. The altered position of guiding element 545 causes movement of LED 100 with respect to window 506.

The shifting or altered position of guiding element 545, and the subsequent movement of LED array 100, is determined based on a frequency of the applied alternating voltage to coil 570.

In one aspect of the invention, rod 560 may include an enlarged first end 535, in proximity to magnet 530. Enlarged end 535 increases the intensity of the magnetic field of rod 560 sliding within tube element 565. Enlarged first end 535 may be integral to rod 560 or may be attached, by an adhesive, for example to rod 560.

Figure 6:
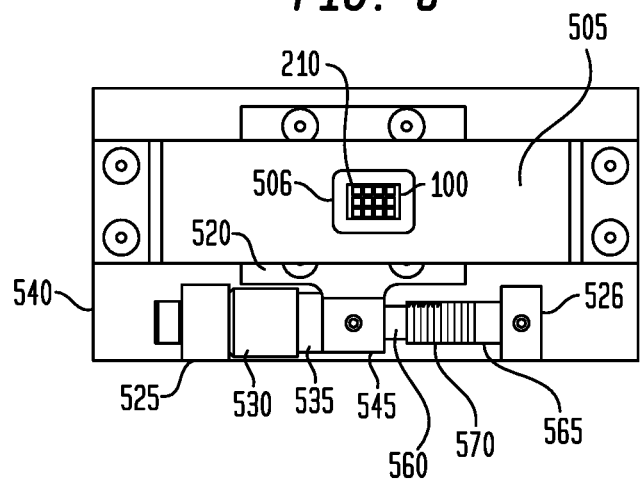
FIG. 6 illustrates a top view of the exemplary oscillating platform shown in FIG. 5.

FIG. 6 illustrates a top view of the platform 500 shown in FIG. 5. LEDs 110.1 . . . 110.*n* (as shown by LED array 100), attached to linear guide 520, and aperture 210 are shown through window 506. In this illustrated example, LEDs 110.1 . . . 110.*n* are shown positioned toward a left-most edge of the window 506 as rod 560 (or enlarged end 535) is proximate to, or in contact with, magnet 530.

Figure 7:
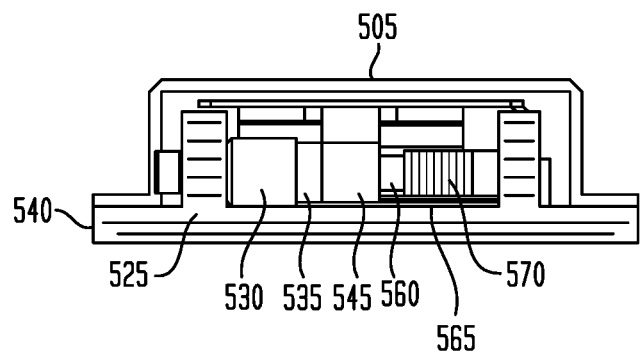
FIG. 7 illustrates a side view of the exemplary oscillating platform shown in FIG. 5

FIG. 7 illustrates a side view of the platform shown in FIG. 5. In this illustrated example, the enlarged end 535 of rod 560 is shown proximate to, or in contact with, magnet 530.

In one aspect of the invention, rod 560 is composed of a magnetic material (e.g., steel or iron) and tube element 570 is composed of a non-magnetic material (e.g., brass). When electrical energy is passed through coil or windings 570 surrounding tube element 565, the magnetic field generated by coil 570 magnetizes rod 560. The attractive/repulsion interaction between the magnetic field of magnetized rod 560 and the magnetic field of magnet 530 causes the position of rod 560 to vary within tube element 565.

Although, steel and brass are discussed for rod 560 and tube 565, respectively, it would be known in the art that any known combination of magnetic and non-magnetic materials for rod 560 and tube element 565, respectively, may be used without altering the scope of the invention.

Figure 8:
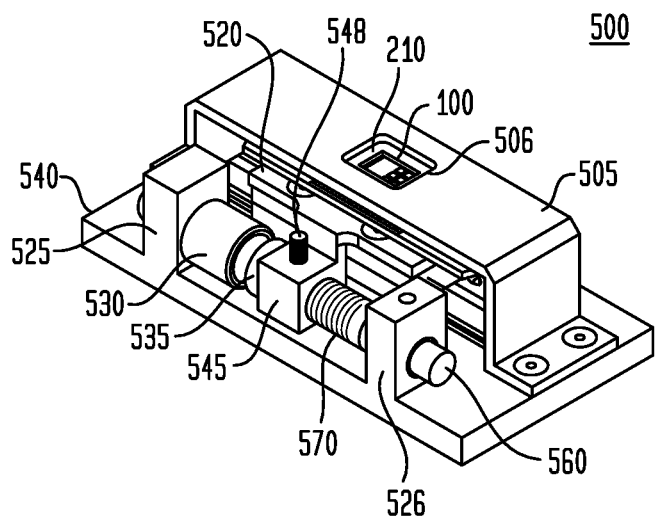
FIG. 8 illustrates a prospective view of a second aspect of the first embodiment of an exemplary oscillating platform in accordance with the principles of the invention.
Figure 9:
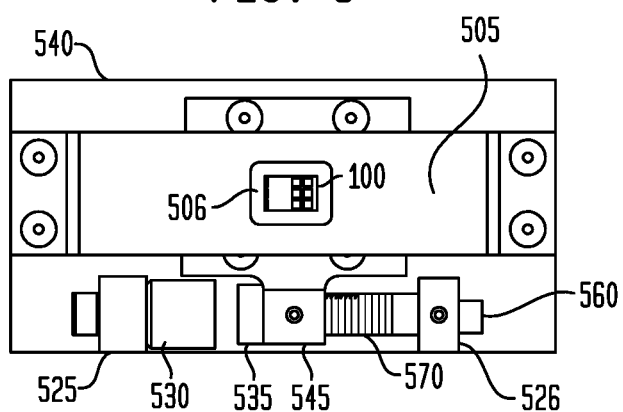
FIG. 9 illustrates a top view of the exemplary oscillating platform shown in FIG. 8.
Figure 10:
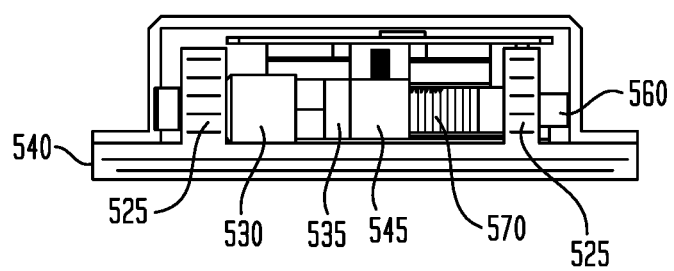
FIG. 10 illustrates a side view of the exemplary oscillating platform shown in FIG. 8.

FIGS. 8, 9 and 10 illustrate a second aspect of the first embodiment of the invention corresponding to FIGS. 5, 6, and 7 respectively. In this second aspect of the first embodiment the magnetic pole of the first end of rod 560 has changed from one that is attached to magnet 530 to one that is repealed from magnet 530.

FIG. 8 illustrates a perspective view of this second aspect of the first embodiment of the invention wherein rod 560 is shown in a position repealed from (i.e., not proximate, or in contact with), magnetic 530.

FIG. 9, which is a top view of this second aspect of the first embodiment of the invention, illustrates position of LEDs 110.1 . . . 110.*n* with respect to window 506. In this illustrated case, LEDs 110.1 . . . 110.*n* are positioned toward a right edge of window 506, as LEDs 110.1 . . . 110.*n* are shifted by the shift in guide 520 caused by the repealing of first end of rod 560 from magnet 530.

FIG. 10, which is a front view of this second aspect of the first embodiment of the invention, rod 560 is illustrated as no longer being in contact with, or proximate to, magnet 530.

In accordance with the principles of the invention, as the end of rod 560 (e.g., enlarged end 535) closest to magnet 530 experiences a polarity opposite that of the polarity of magnet 530, rod 560 is drawn toward magnet 530 (FIGS. 5, 6, 7), whereas, when the first end of rod 560 (e.g., enlarged end 535) closest to magnet 530 experiences a polarity the same as that of the polarity of magnet 530, rod 560 is repealed from magnet 530 (FIGS. 8, 9, 10).

Accordingly, the position of LED array 100 within window 506 oscillates linearly as rod 560 (and consequently linear guide 520) experiences changes in position caused by one of attraction of first end of rod 560 to, or the repulsion of first end of rod 560 from, magnet 530. The rate of attraction and repulsion being determined based on a frequency of the alternating voltage applied to coil 570.

Although not shown, it would be appreciated that a source of electrical energy is provided to coil element 570. For example, the energy source may be a battery supplying a DC voltage, that is then "chopped" to produce a chopped DC voltage. Alternatively, the energy source may be an AC voltage source that produces a voltage of alternating polarity.

Electrical energy sources, such as batteries and AC supplies, are well known in the art and need not be discussed in detail herein.

Accordingly, as electrical energy provided to coil element 570 varies in polarity, from positive to negative voltage levels (i.e., AC voltage or current or chopped DC voltage levels), the changing voltage/current polarities causes a change in the magnetic field generated by windings 570. Rod 560, responsive to the change in the magnetic field of coil element 570 slides back and forth within tube element 565. Consequently, as rod 560 slides back and forth (i.e., oscillates) within tube element 565, the attached guide standoff 545 shifts its position. The shifting position of guide standoff 545 causes linear guide 520 (and LED array 100) to shift with respect to window 506.

The shifting (oscillation, movement or jitter) of the LED array 100, causes the light generated from each of the individual LEDs 110.1 . . . 110.*n* to be blended such that a shape of the individual LEDs is not discernible in the image projected onto surface 240. That is the light pattern projected onto surface 240 appears substantially uniform.

In accordance with the principles of the invention, the intensity and/or color of the substantially uniform image projected onto surface 240 is determined based on at least one of: the wavelength output of each of the specific LEDs 110.1 . . . 110.*n*, a color temperature output of each of the specific LEDs and a rate of oscillation of rod 560, wherein the rate of oscillation of rod 560 may be determined based on a frequency of the electrical energy applied to coil element 580.

Although, the movement of rod 560 is shown in a horizontal manner, it would be recognized that the platform 500 may be oriented in a vertical or diagonal manner such that the linear movement of rod 560 may occur in a vertical or a diagonal direction.

Although, the oscillation or movement of rod 560 within sleeve or tube element 565 is discussed with regard to a binary change in voltage polarity (i.e., positive to negative or negative to positive) of the applied voltage, it would be recognized that the change in voltage/current to coil element 570 may be achieved using a non-binary method. That is, the change in voltage/current may be achieved using, for example, Pulse Coded Modulation (PCM) method wherein a level and a polarity of voltage/current applied to coil element 570 may be altered to vary the intensity of the magnetic field generated or the direction of the magnetic field generated by coil element 570.

In this matter, LED array 100 may be viewed as being randomly oscillated or jittered and not one of merely back and forth.

Although not shown it would be appreciated that the application of voltage/current to coil element 570 is controlled by circuitry (not shown). For example, electronic circuitry on PCB 120 may regulate the voltage/current levels and the rate of phase change of the applied voltage/current to control the frequency of oscillation of linear guide (or movable plate) 520. Or the electronic circuitry may be contained on a second PCB.

Figure 11:
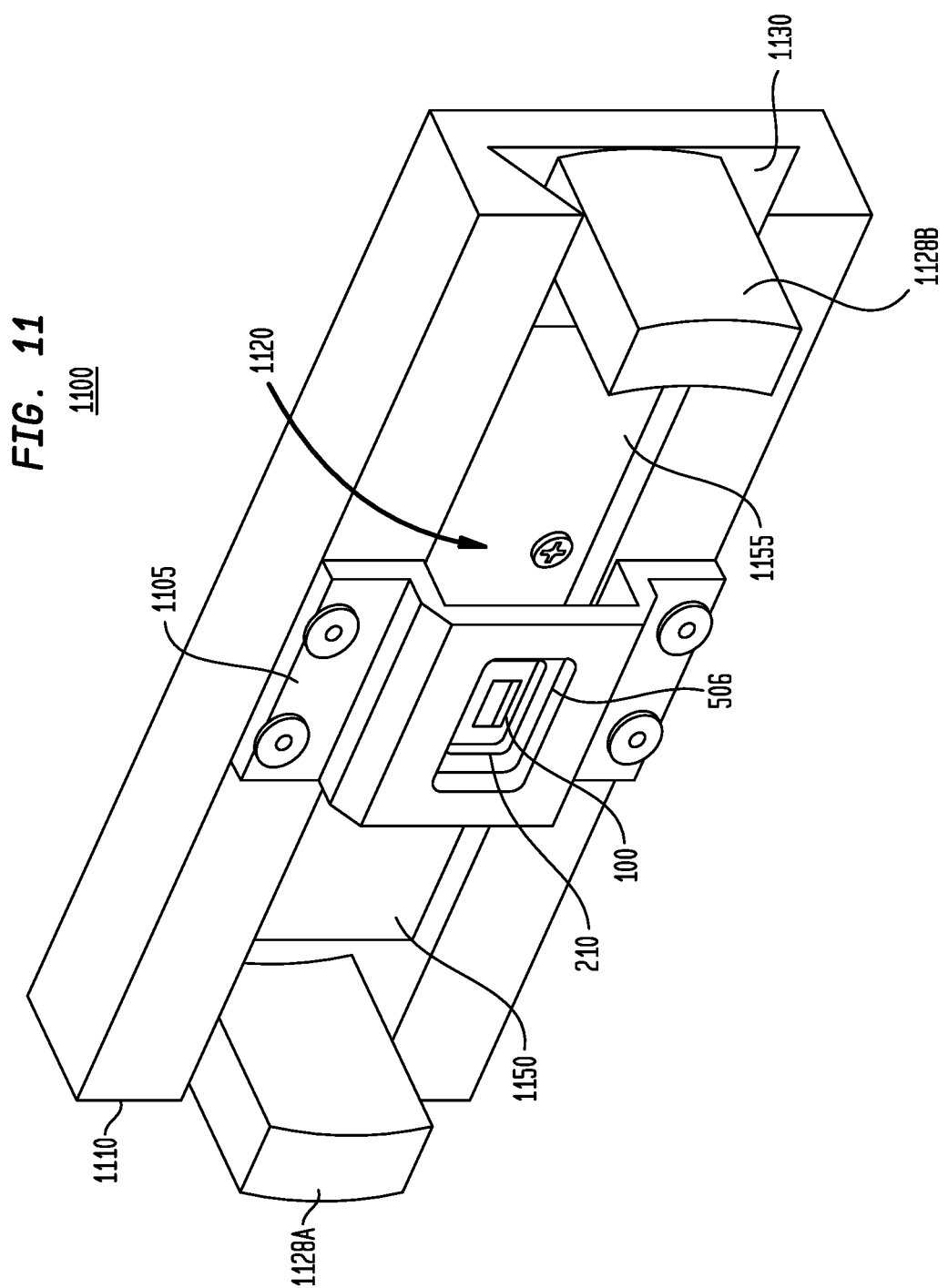
FIG. 11 illustrates a prospective view of a second embodiment of an exemplary oscillating platform in accordance with the principles of the invention.

FIG. 11 illustrates a perspective view of a second exemplary embodiment of an oscillating platform 1100 in accordance with the principles of the invention.

In this illustrated embodiment, a stationary, non-magnetic, mounting plate element 1110 includes, therein, a channel 1130 that extends substantially a length of the mounting plate element 1110. Channel 1130 is illustrated as a dovetail channel, which allows for the retainment of movable plate 1120 while allowing for the movement of movable plate 1120, within channel 1130. Although a dovetail configured channel 1130 is shown, it would be recognized that the channel may be of other configurations that are suitable for retaining movable plate 1120 while allowing movable plate 1120 to slide therein. For example, channel 1130 may be constructed as a "T-slot" channel.

Channel 1130 in mounting element 1110 is represented (in a cross-sectional view) as a female dovetail channel, which allows for the retention of a corresponding male dovetail joint. Similarly, a T-slot channel in mounting element 1110, represented as a female T-slot, allows for the capture of a corresponding male "T." Accordingly, movable plate 1120 would be shaped as one of a male dovetail or a male "T."

Further illustrated is bridge element 1105 attached to mounting plate element 1110 and spans channel 1130. Bridge element 1105 includes window 506. LED array 100 (and aperture 210) mounted on movable plate 1120 is (are) viewable through window 506.

Further illustrated are magnetic elements 1128A, 1128B mounted on opposite ends of channel 1130 within the stationary mounting plate 1110. Magnets 1128A, 1128B are illustrated within channel 1130 to close channel 1130 to prevent movable plate 1120 from exiting channel 1130. However, it would be recognized that channel 1130 may have closed ends (i.e., a blind channel), and magnets 1128A, 1128B may be attached proximal to the blind ends of channel 1130 or along a corresponding end of the closed channel.

Although FIG. 11 illustrates magnets 1128A, 1128B, it will be recognized and appreciated that in accordance with the principles of the invention, only one of magnets 1128A and 1128B may be utilized. In addition, magnets 1128A, 128B may be operated individually or in concert with each other to cause movable plate 1120 to move or oscillate within channel 1130.

In accordance with a first aspect of the second exemplary embodiment shown, magnets 1128A, 1128B, may be electromagnets, wherein the magnetic field generated by electromagnets 1128A and 1128B, varies with a change in the polarity of an applied voltage. For example, an AC, or chopped DC, voltage may be applied to electromagnet 1128A, while an AC, or chopped DC, voltage of 180 degrees out-of-phase to the voltage applied to electromagnet 1128A may be applied to electromagnet 1128B. The out-of-phase voltage applied to electromagnet 1128B generates a magnetic field that is opposite to that of the magnetic field generated by electromagnet 1128A.

According, in this exemplary configuration, with movable plate 1120 being of a magnetic material having a positively charged magnetic first end 1150 and a negatively charged magnetic second end 1155, as electromagnet 1128A is magnetized to pull first end 1150 of movable plate 1120 toward electromagnet 1128A, electromagnet 1128B is magnetized to repulse second end 1155 of movable plate 1120. Similarly, when the polarity of electromagnets 1128A and 1128B are reversed, first end 1150 of movable plate 1120 is repulsed from electromagnet 1128A while second end 1155 of movable plate 1120 is attracted toward electromagnet 1128B.

LED array 100, attached to movable plate 1120 is viewed through window 506 as movable plate 1120 shifts or oscillates between electromagnets 1128A and 1128B causing the light projected through projection lens 220 (FIG. 2) to be blended such that an image of the blended light when viewed on surface 240 is rendered substantially uniform.

As previously discussed, the application of voltage/current to electromagnets 1128A and 1128B rather than being in a binary manner, which allows from a binary movement of movable plate 1120, may also be applied using a PCM scheme, for example, wherein the movement of plate 1120 is determined by a level and/or polarization of the applied voltage/current.

In accordance with a second aspect of the second exemplary embodiment of the invention, wherein movable plate 1120 is composed of a magnetic material, without any specific magnetic polarization, voltage/current may be applied to electromagnets 1128A, 1128B individually in a timed manner. In this case, a voltage applied to electromagnet 1128A causes movable plate 1120 to be attached to electromagnet 1128A, while no voltage/current is applied to electromagnet 1128B. Similarly, a voltage applied to electromagnet 1128B causes movable plate 1120 to be attached to electromagnet 1128B, while no voltage/current is applied to electromagnet 1128A, which causes movable plate 1120 to move toward electromagnet 1128B.

Although not shown it would be appreciated that the application of voltage/current to electromagnets 1128A, 1128B, individually or in combination is controlled by electrical or electronic circuitry. The electronic/electrical circuitry regulates the voltage/current levels and the rate of phase change of the applied voltage/current to regulate and control the frequency of oscillation of movable plate 1120.

In accordance with a third aspect of the second embodiment of the invention, wherein only one of magnets 1128A and 1128B is implemented, and the single magnet (e.g., 1128A) is an electromagnet, the application of an electrical energy, of alternating polarity, to the single magnet (e.g., 1128A) generates an alternating polarity magnetic field. The movable platform 1120, having at least one end (e.g., closest to the single magnet) of a fixed magnetic polarity, is attracted to, or repealed from, the single magnet (e.g., 1128A) as the magnetic field of the single magnet is altered by the alternating polarity of the applied electrical energy.

As previously discussed, the application of voltage/current to the electromagnets 1128A, 1128B may be binary, such that movable plate 1120 slides binarily (i.e., back and forth) within channel 1130. Or may be applied randomly with different voltages, such that movable plate 1120 may jitter with channel 1130. In this case, jitter refers to movement that amount to different degrees of movement in different or the same direction. For example, rather than a left movement from a first end of channel 1130 to second end and then a right movement from the second end to the first end (i.e., linear), a jitter may represent random combinations of left and right movement (e.g., left, left, right, left, right, right . . . etc.) wherein each movement does not extend the length of channel 1130.

Figure 12:
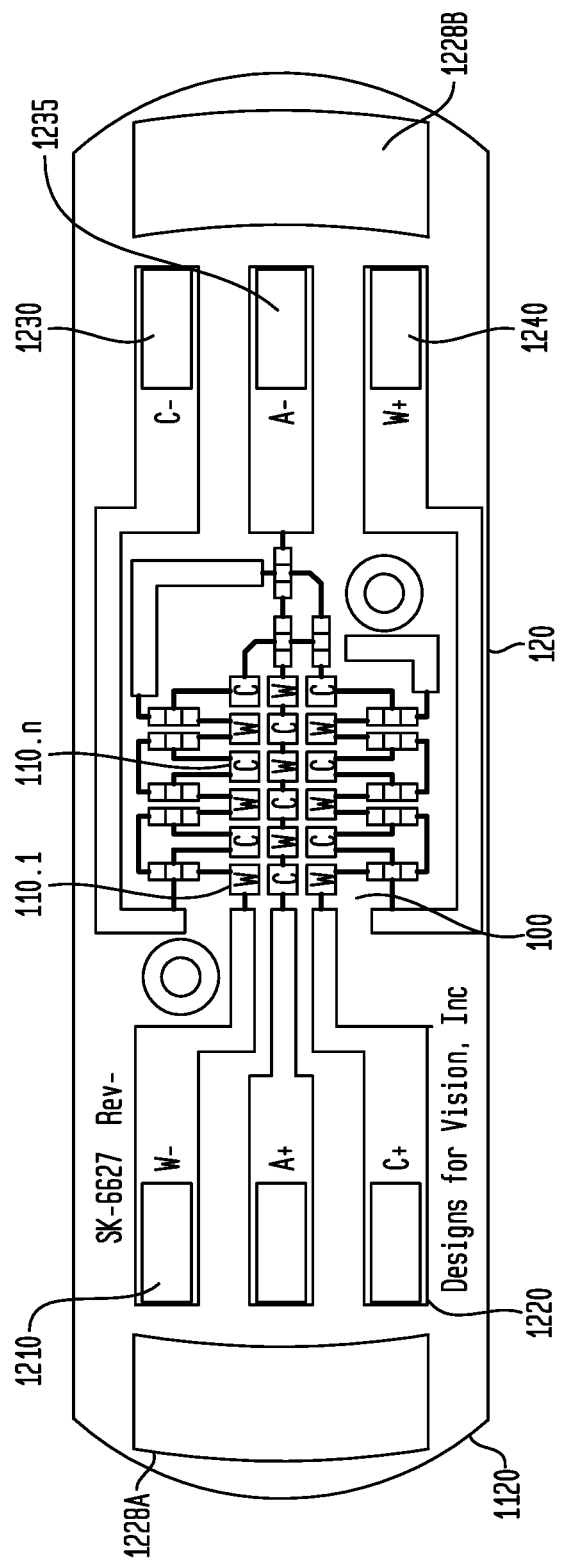
FIG. 12 illustrates a front view of an exemplary LED/PCB configuration associated with the embodiment shown in FIG. 11 in accordance with the principles of the invention.

FIG. 12 illustrates a front view of an exemplary PCB 120/LED 100 configuration incorporated onto movable plate 1120 in accordance with the principles of the invention shown in FIG. 11.

In this exemplary embodiment LED array 100, located substantially centered on PCB 120 is composed of a plurality of LEDs 110.1 . . . 110.$n$, (i.e., 18 LEDs arranged in a 6×3 matrix). Further illustrated are electrical pads 1210, 1220, 1230, 1235, 1240, which provide at least one of power (i.e., voltage/current) and control signals to one or more LEDs 110.1 . . . 110.$n$ within one or more rows/columns of array 100. Application of power through LED driver circuits to LEDs 110.1 . . . 110.$n$ to turn ON/OFF, for example, is well known in the art and is controlled by electronic elements (not shown) positioned on PCB 120. LED driver circuits are well known in the art and the specific elements of such driver circuits need not be discussed in detail, herein.

The driver circuits may be programmed such that selected ones of the LEDs 110.1 . . . 110.$n$ may be turned on while others may be turned off. Similarly, all LEDs 110.1 . . . 110.$n$ may be turned OFF or turned ON. As previously discussed, the voltage applied to selected ones of LEDs 110.1 . . . 110.$n$ may be different than the voltage applied to other selected ones of LEDs 110.1 . . . 110.$n$.

Further illustrated are magnets 1228A, 1228B, shown on opposite ends of PCB 120. In one aspect of the invention, magnets 1228A, 1282B, provide for the existence of a specific orientation of a magnetic field associated with movable plate 1120 which interact with the magnetic fields of magnets 1128A, 1128B, respectively, as discussed with regard to FIG. 11. For example, magnets 1228A, 1228B may be of a different polarization on their external faces such that one of magnets 1228A exhibits a North pole while magnet 1228B exhibits a South pole.

Although two magnets 1228A, 1228B are shown, it would be appreciated that only one of magnet 1228A, 1228B may be utilized without altering the scope of the invention.

As previously discussed, in accordance with one aspect of the invention, neither magnet 1228A nor 1128B need be incorporated onto PCB 120 (and consequently movable plate 1120). (see FIG. 11).

Although magnets 1228A and 1228B are shown on PCB 120, it would be recognized that magnets 1228A and 1228B may be positioned on first end 1150 of movable plate 1120 and second end 1155 of movable plate 1120 (FIG. 11). The exact location of magnets 1228A and 1228B, whether on movable plate 1120 or PCB 120, may be determined in part based on a size of the PCB 120 and movable plate 1120.

That is, while FIG. 11 illustrates movable plated 1120 to be considerably larger than window 506 through which array 100 is shown, this illustration is not drawn to scale and PCB 120 may extend over an entire (or substantially an entire) length of movable plate 1120.

Magnets 1228A, 1228B provide means for magnetizing the ends of movable plate 1120 such that movable plate 1120 operates in accordance with the aspects of the invention discussed with regard to FIG. 11.

In addition, while the aspects of the invention regarding FIG. 11, have been discussed with regard to magnetic ends of movable platform 1120 (e.g., magnets 1228A, 1228B are positioned on the movable plate 1120) and electromagnets 1128A, 1128B positioned on a non-moving mounting plate 1110, it would be recognized that magnets 1228A, 1228B may also be electromagnets.

In this case, electromagnetics 1228A, 1228B may be constructed and operated to have a polarity to cause attraction to, or repulsion from, a corresponding one of magnet 1128A, 1128B. For example, voltage applied to magnet 1228A may be 180 degrees out-of-phase to a voltage applied to magnet 1128A. In this manner movable plate 1120 is attached toward magnet 1128A. Similar application of voltage may be applied to magnets 1228B and 1128B.

In still another aspect of the invention, magnets 1128A, 1128B may be permanent magnets while magnets 1228A, 1228B may be electromagnets. In this aspect of the invention, a voltage/current applied to a corresponding one of the electromagnets 1228A, 1228B causes an attraction to, or repeal from, a corresponding one of magnets 1128A, 1128B, in a manner similar to that previously discussed.

In each of these aspects of the invention, the voltage applied to the magnets 1128A, 1128B, 1228A, 1228B, may be applied to cause a linear or a jittered movement of movable plate 1120 (and consequently LED array 100).

Figure 13A:
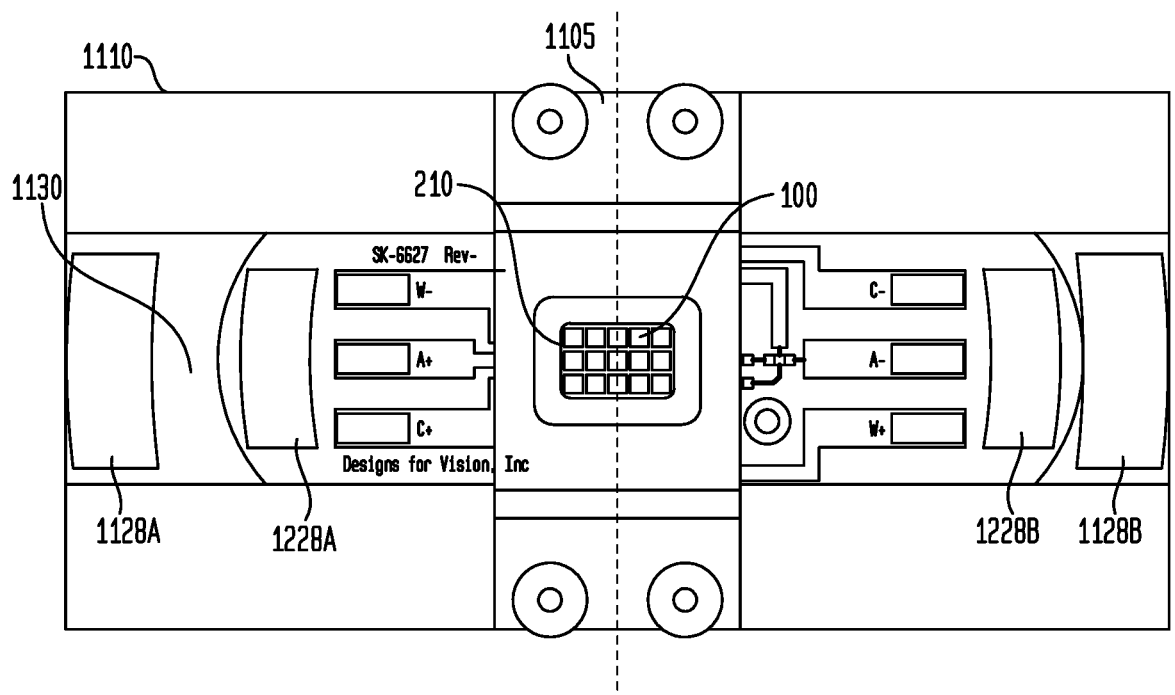
FIG. 13A illustrates a front view of a first aspect of the exemplary LED/120 configuration shown in FIG. 12.

FIG. 13A illustrates a first aspect of movable platform 1120 shown in FIG. 11 including PCB 120 of FIG. 12 in accordance with the principles of the invention.

In this illustrated first aspect, mounting plate 1120 is slidable within channel 1130, as previously discussed (see FIG. 11). Positioned on stationary mounting plate 1110 are magnets 1128A and 1128B. Although the exemplary configuration shown depicts two magnets 1128A and 1128B, it would be recognized that only a single magnet 1128A or 1128B may be utilized without altering the scope of the invention claimed.

Further illustrated are magnets 1228A and 1228B positioned on movable platform 1120/PCB 120, as discussed with regard to FIG. 12.

In this first aspect of the invention, LED array 100 is positioned substantially centered in window 506 as magnet 1228B is attached to magnet 1128B. To achieve this configuration, at least magnets 1128B and 1228B possess opposite polarity magnetic field such that movable plate 1120 is attracted to, or drawn toward, magnet 1128B. In another configuration, magnet 1128A may not exhibit a magnetic field (i.e., not electrically active). In another configuration, an electrical energy may be applied to magnet 1128A such that magnet 1228A is repulsed from magnet 1128A.

Figure 13B:
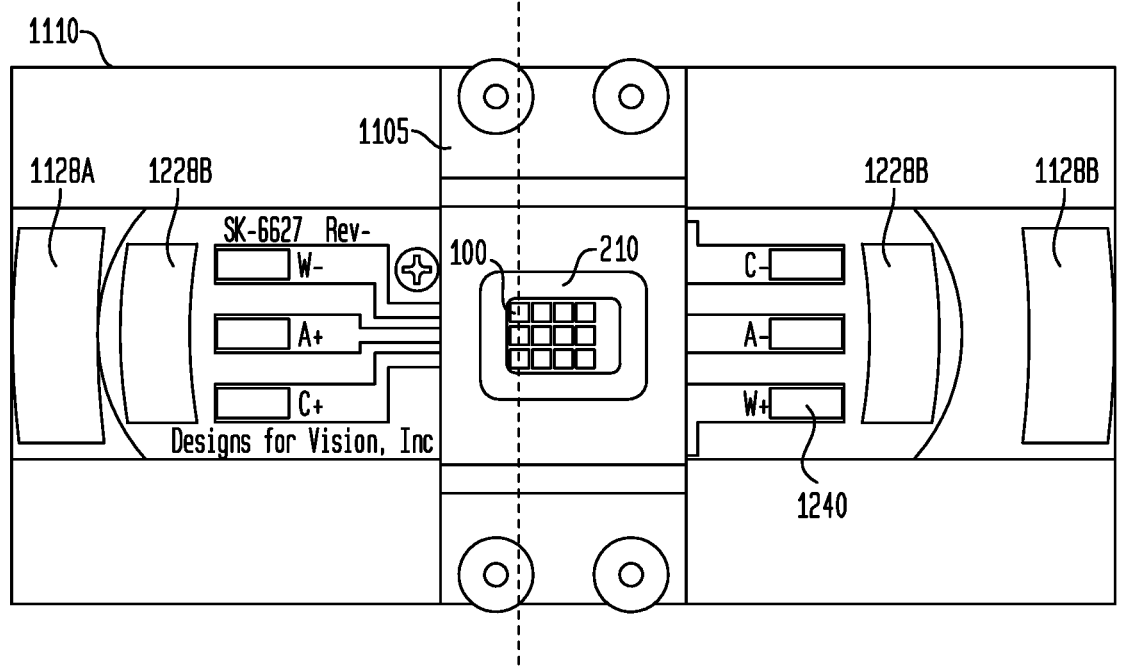
FIG. 13B illustrates a front view of a second aspect of the exemplary LED/PCB configuration shown in FIG. 12.

FIG. 13B illustrates a second aspect of the invention shown in FIG. 11, wherein movable platform 1120 is positioned proximate to magnet 1128A. In this case, LED array 100 is offset from the center of window 506 as it is positioned closer to the left most side of window 506.

In this case, movable plate 1120/PCB 120 is drawn toward magnet 1128A as magnet 1128A generates a magnetic field having a polarity opposite to that of magnet 1228B. Similarly, electrical energy need not be applied to magnet 1128B or electrical energy may be applied to magnet 1128B such that a magnetic field generated is of an opposite polarity as that of magnet 1228B; causing movable plate 1120/PCB 120 to be repulsed from magnet 1128B.

As discussed, the shifting, (oscillating, jittering) of the LEDs 110.1 . . . 110.*n* within the window 506 causes a blending of the light outputted by the LEDs, such that an image of the projected light directed to a surface is viewed as being substantially uniform.

As would be recognized, LEDs 110.1 . . . 110.*n*, within LED array 100 may be of a same color (e.g., all white, all red, all blue, all green etc.) or may be of mixed color (e.g., red, green, blue, white) or may have different color temperatures (e.g., warm, cool). In one embodiment, wherein warm and cool LEDs are incorporated, the arrangement of the LEDs is one of altering warm and cool LEDs. That is, considering an exemplary array configuration, one row may contain altering warm/cool LEDs, whereas a next row may contain altering cool/warm LEDs.

As would be appreciated, mounting plate 1110 and movable plate 1120 may be constructed of a non-magnetic material in the configuration shown in FIG. 12. In this case, the alternating magnetic fields of the illustrated magnets attract or repeal movable plate 1120. However, in a configuration shown in FIG. 11, movable plate 1120 may be of a magnetic material (or contain magnets thereon), wherein the movable plate 1120 is attached to one or the other of magnets 1128A, 1128B.

Figure 14:
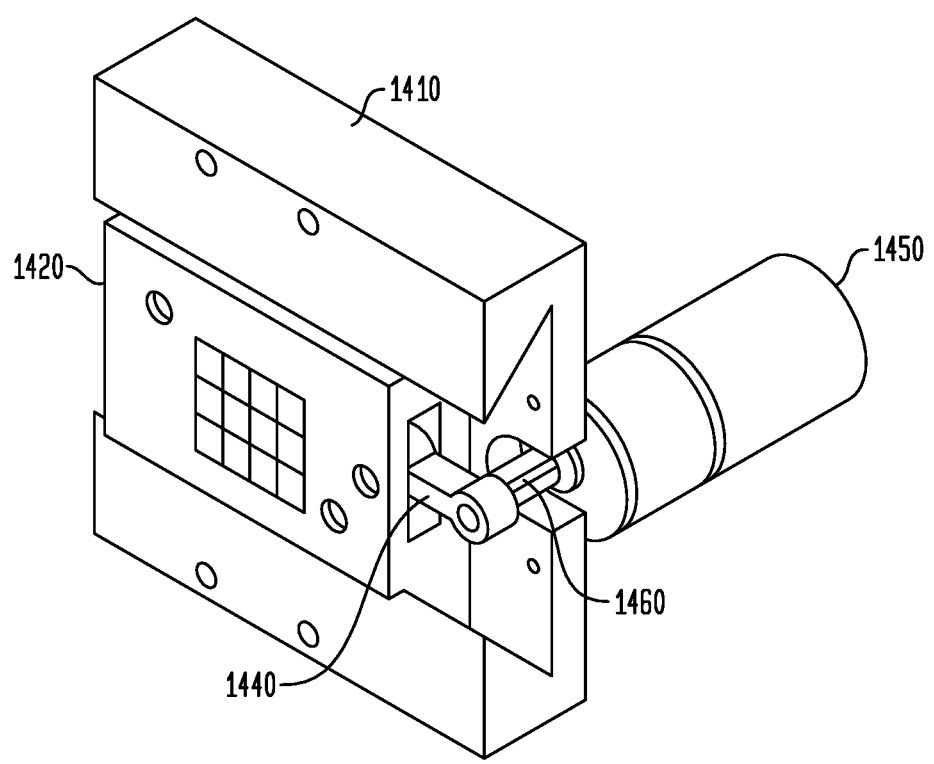
FIG. 14 illustrates a prospective view of a third embodiment of an exemplary oscillating platform in accordance with the principles of the invention.

FIG. 14 illustrates a prospective view of a third embodiment of an exemplary oscillating platform in accordance with the principles of the invention.

In this illustrated embodiment, non-moving element 1410 includes a channel 1430, which is illustrated as a dovetail channel. However, as previously discussed, the channel may similarly be a T-slot channel and is considered within the scope of the invention.

Within channel 1430 is movable platform 1420, which glides within channel 1430.

Movable platform 1420 is connected to motor 1450 through rod 1440. Motor 1450, which is fixed to the mounting plate 1410, is attached to rod 1440 and held by offset pin 1460. Rod 1440 translates a rotational movement of motor 1450 into a linear movement of platform 1420. Motor 1450, which may be DC driven motor, is controlled by electrical/electronic circuitry (not shown) that regulates the rotational speed of motor 1450 to regulate and control a movement (i.e., oscillation) of movable plate 1420 within channel 1430.

Although not shown it would be recognized that a plurality of gears may be included between motor 1450 and rod 1440. The plurality of gears may be used to adjust the rotational speed of motor 1450 to control the linear movement of plate 1420. Rotational speed adjustment, through a plurality of gear (i.e., a gear train) is well-known in the art and it would be within the skill of knowledgeable persons to translate the rotation of motor 1450 into a desired frequency of linear motion of movable plate 1420.

Further shown is LED array 100 affixed to movable plate 1420. As previously discussed LED array 100 oscillates in accordance with the movement of movable plate 1420.

As previously discussed LEDs 110.1 . . . 110.*n* within LED array 100 may be of a same color, of a different color and of a same or of a different color temperature. The specific color and/or temperature projected onto a surface 240 (FIG. 2) is determined based on the rate of oscillation of movable plate 1420.

Figure 15A:
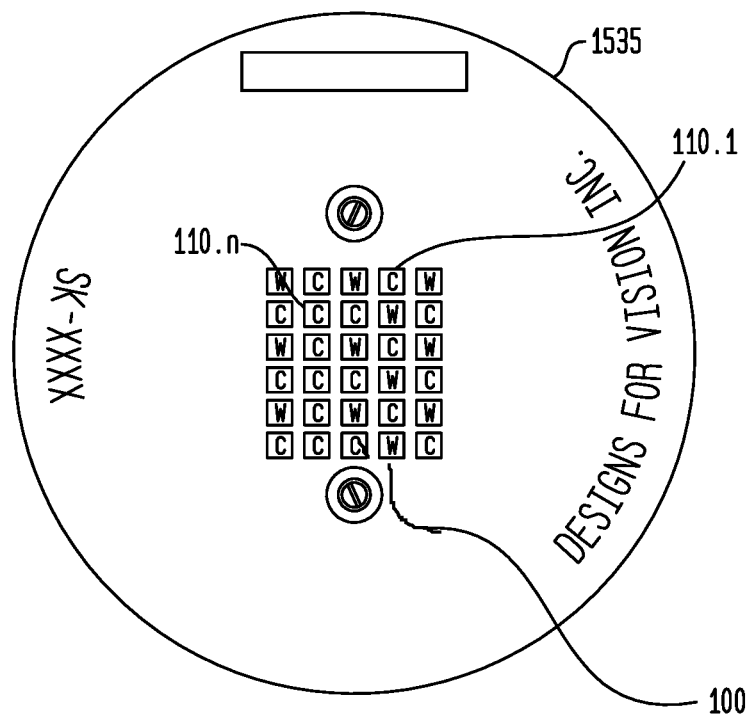
FIG. 15A illustrates a front view of an exemplary PCB/LCD configuration associated with the embodiment shown in FIG. 14, in accordance with the principles of the invention.

FIG. 15A illustrates a front view of an exemplary PCB 120 embodiment in accordance with the principles of the invention.

In this illustrated embodiment, LED array 100, composed of 30 LEDs, in an exemplary 6×5 array, are positioned substantially centered on PCB 1535. LED array 100 and LEDs 110.1 . . . 110.*n* are similar to those previously discussed and a detailed discussion of the operation and/or characteristics of LEDs 110.1 . . . 110.*n* presented in FIG. 15A need not be further discussed herein.

Figure 15B:
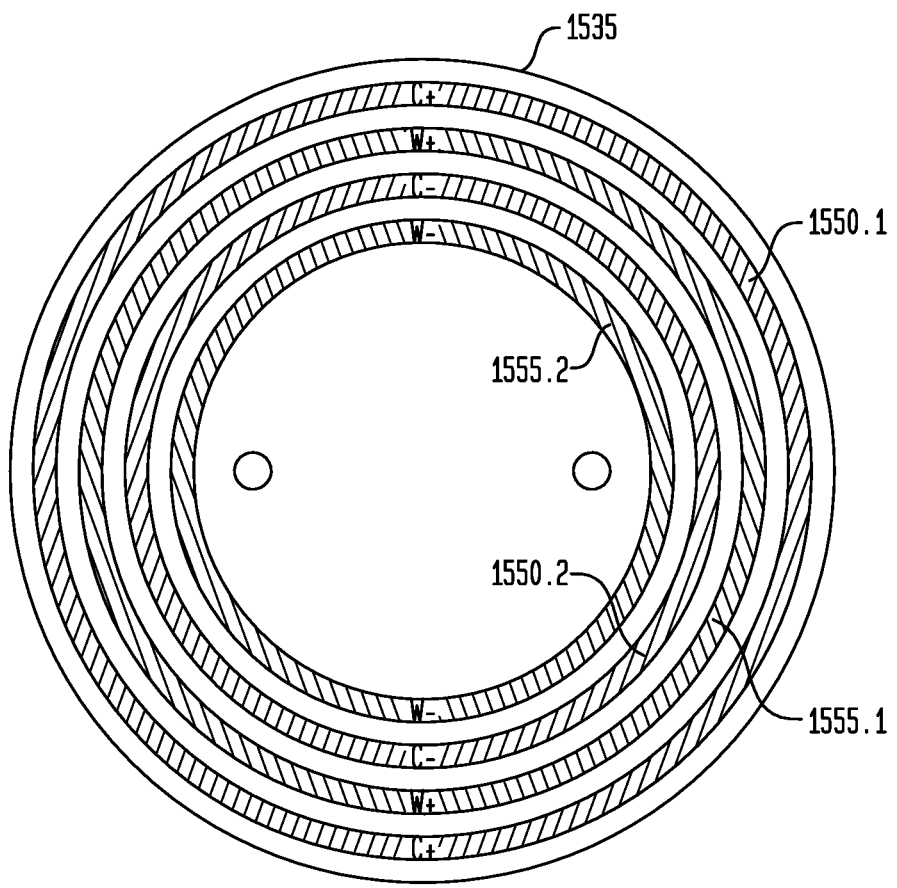
FIG. 15B illustrates a back view of the exemplary PCB/LCD configuration shown in FIG. 15A

FIG. 15B illustrates a back view of the exemplary PCB 1535 embodiment shown in FIG. 15A.

In this exemplary embodiment, PCB 1535 includes a plurality of the electrical connection tracks 1550.1 . . . 1550.*n*, concentrically located about PCB 1535. Tracks 1550.1 . . . 1550.*n* are configured to supply or apply electrical energy to corresponding ones of LEDs 110.1 . . . 110.*n*

In the exemplary configuration shown, LEDs 110.1 . . . 110.*n* are presented as alternating cool and warm LEDs, wherein cool LEDs, labeled with the letter C, are shown intermixed with warm LEDs, labeled with the letter W.

In this exemplary configuration, tracks 1550.1 and 1550.3 provide a voltage to a first set of LEDs (e.g., cool LEDs) whereas tracks 1555.1 and 1555.2 provide a voltage to a second set of LEDs (e.g., warm LEDs). Electrical connection of tracks 1550.1, 1550.2, 1555.1 and 1555.2 to corresponding ones of the cool and warm LEDs is not shown as such connections are well known to those skilled in the art. (see for example, the electrical connections shown in FIG. 12).

Similarly, the control circuitry (not shown) for controlling the operation of LEDs 110.1 . . . 110.*n* is similar to that discussed with regard to FIG. 12, for example. Accordingly, a further detailed discussion regarding the operation of such control circuitry is well within the knowledge of those skilled in the art.

Figure 16:
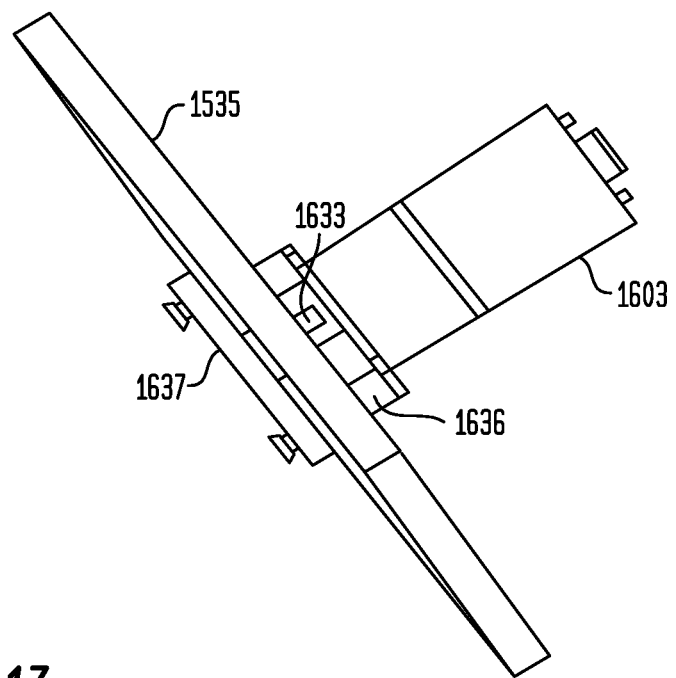
FIG. 16 illustrates a side view of a fourth embodiment of an exemplary oscillating platform in accordance with the principles of the invention.

FIG. 16 illustrates a side view of a fourth embodiment of an exemplary oscillating platform in accordance with the principles of the invention.

In this illustrate embodiment, a motor 1603 is attached to PCB 1535 shown in FIG. 15A,15B. Motor 1603, positioned in collar 1636, is held in place by pin 1633. Electrical energy (not shown) applied to motor 1603 causes motor 1603 to rotate. The rotation of motor 1603 causes a rotation of PCB 1535 and LED array 100, positioned thereon. As the LEDs 110.1 ... 110.n, pass before a window (not shown but similar to the window 506, FIG. 5 previously disclosed), the light outputted by the LEDs 110.1 ... 110.n, is blended together, such that an image of the blended light when viewed on a surface a known distance from the LEDs is perceived as being substantially uniform.

Figure 17:
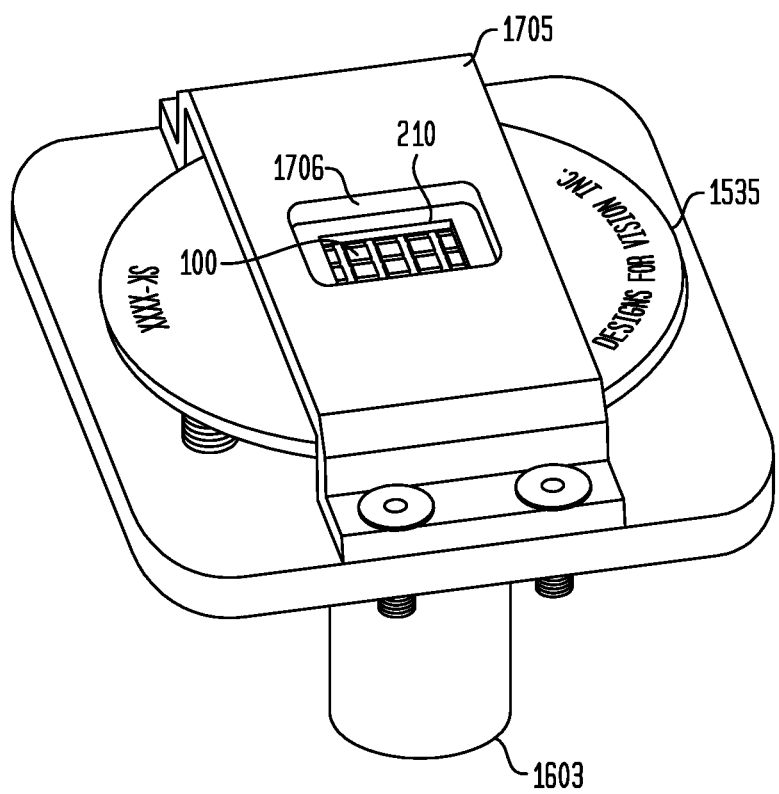
FIG. 17 illustrates a prospective view of the exemplary embodiment shown in FIG. 16.

FIG. 17 illustrates a prospective view 1700 of the embodiment shown in FIG. 16.

In this illustrated embodiment, window 1706 is shown in bridge element 1705 (which is similar to the bridge element 506 previously disclosed). Within window 1706 is shown LED array 100 (optionally including aperture 210 positioned on array 100, as previously discussed). Further illustrated is motor 1603, which causes the rotation of PCB 1535 and LED array 100.

In accordance with the principles of the invention, an image from the light of the individual LEDs, when projected onto a surface is substantially uniform as the rotation of the LEDs 110.1 ... 110.n blends their outputted light. In addition, an intensity and/or color of the uniform projected image may be determined based on the characteristics (e.g., color/temperature) of LEDs 110.1 ... 110.n and the rotational rate of LED array 100.

Figure 18:
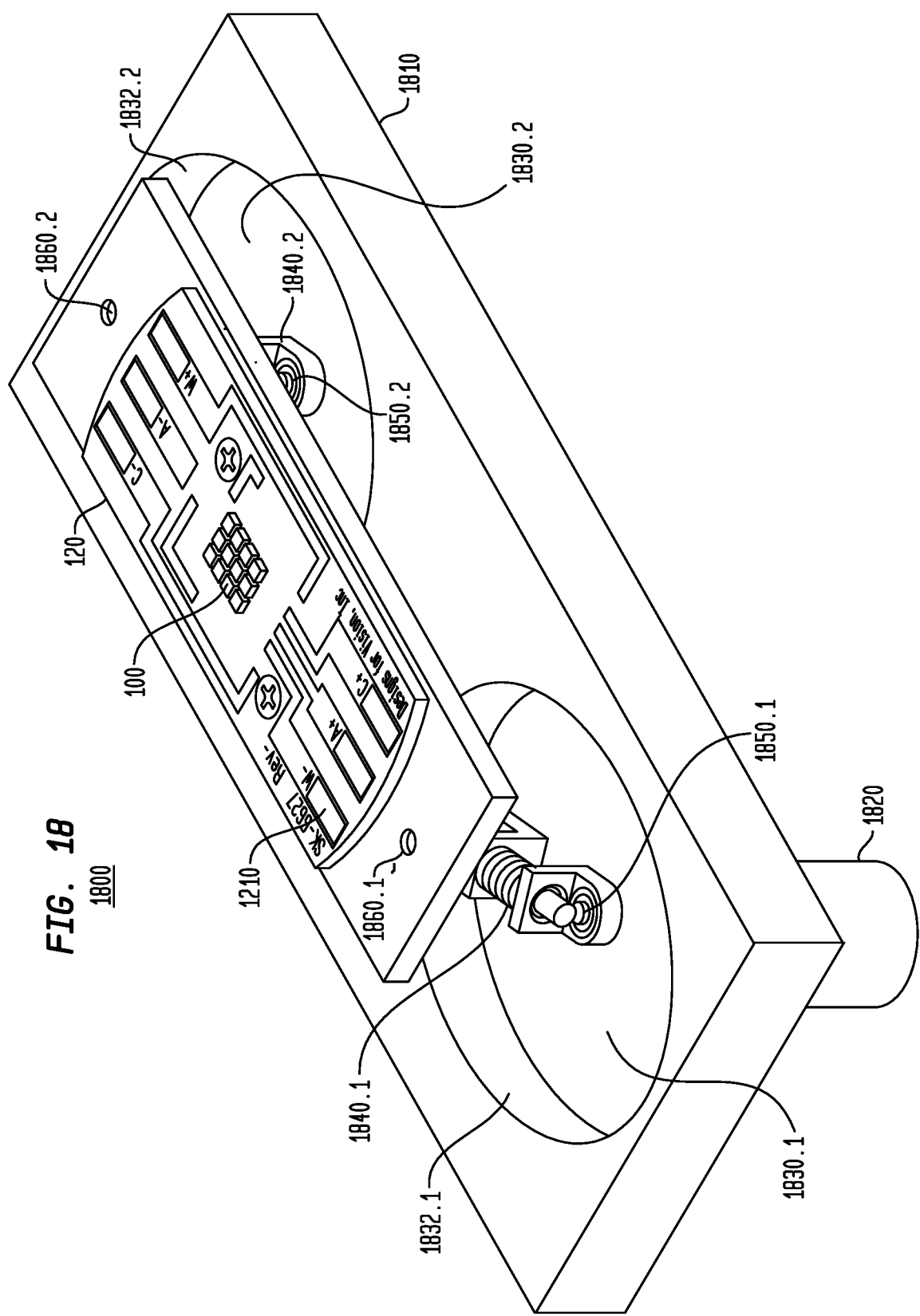
FIG. 18 illustrates a prospective view of a fifth embodiment of an exemplary oscillating platform in accordance with the principles of the invention.

FIG. 18 illustrates a perspective view of a fifth exemplary embodiment of the invention in accordance with the principles of the invention.

In this illustrated embodiment 1800, platform 1810 includes a first recess 1830.1 and a second recess 1830.2. The centers of recesses 1830.1 and 1830.2 being along a line substantially parallel to an edge of platform 1810. Recesses 1830.1 and 1830.2 are defined by continuous walls 1832.1, 1832.2, respectively, extending downward from a top surface of platform 1810.

Further shown is guiding assembly 1840.1 contained in recess 1830.1 and guiding assembly 1840.2 contained in recess 1830.2. Guiding assemblies 1840.1 and 1840.2 are connected to corresponding pins 1850.1 1850.2, which extend from substantially a center point of recesses 1830.1 and 1830.2, respectfully.

Attached to guiding assemblies 1840.1 and 1840.2 is PCB 120 including LED array 100. Operation of PCB 120 in controlling the operation of LED array 100 has been previously discussed and a further description of PCB 120 and LED array 100 is not believed necessary based on the prior disclosure presented herein.

In this illustrated embodiment, PCB 120 is attached to guiding assemblies 1840.1 and 1840.2 through pass-through 1860.1 and 1860.2, respectively, wherein a pin on guiding assemblies 1840.1 1840.2 extend through corresponding pass-throughs 1860.1 and 1860.2. PCB 120 is, thus, locked to the movable guiding assemblies 1840.1 and 1840.2.

FIG. 19 illustrates a top view of platform 1810 including recesses 1830.1 and 1830.2 and corresponding guiding assemblies 1840.1, 1840.2.

In this illustrative view, recesses 1830.1 and 1830.2 are shown being of an elliptical form. However, it would be recognized that recesses 1830.1 and 1830.2 may be formed of other shapes (e.g., FIGS. 21-23).

Guiding assembly 1840.1, for example, is composed of an attachment bracket 1843.1 that engages corresponding pin 1850.1, which is substantially centered within recess 1830.1. Guiding assembly 1840.2 is similar to guiding assembly 1840.1, wherein assembly 1840.2 is attached, through attachment bracket 1843.2, to corresponding pin 1850.2 substantially centered within recess 1830.2.

Extending from, and loosely attached to, attachment bracket 1843.1 is rod 1845.1. Further shown is bracket 1870.1 attached to a second end of rod 1845.1. Bracket 1870.1 is a "U-shaped" bracket that allows for the insertion of wheel 1880.1 therein. Wheel 1880.1 is held in place in bracket 1870.1 by pin 1855.1. Rod 1845.1 may be loosely attached to attachment bracket 1843.1 through a hole in bracket 1843.1 to allow rod 1845.1 to shift or move its position with respect attachment bracket 1843.1 as wheel 1880.1 guides along wall 1832.1. Rod 1850.1 is contained within spring 1847.1. Spring 1847.1 provides a tension on wheel 1880.1 to retain it in contact with wall 1832.1. Guiding assembly 1840.2 is similar in construction to that of assembly 1840.1 and a detailed discussion of assembly 1840.2 would be understood by those skilled in the art from the description of assembly 1840.1.

In accordance with the principles of the invention, wheels 1880.1 and 1880.2 remain in contact with corresponding walls 1832.1, 1832.2 (see FIG. 18) in corresponding recess 1830.1 and 1830.2.

Springs 1847.1, 1847.2 provide a force to retain wheels 1880.1, 1880.2 in contact with corresponding wall 1832.1, 1832.2 as rods 1850.1, 1850.2 shift their position with respect to attachment brackets 1840.1, 1840.2. Compression or expansion of springs 1847.1, 1847.2 allows wheels 1880.1, 1880.2, to remain in contact with walls 1832.1, 1832.2 of recesses 1830.1, 1830.2, respectively.

In this illustrated case, wheels 1880.1, 1880.2 are shown in contact with corresponding walls 1832.1, 2832.2, respectively, along a major axis of elliptical recesses 1830.1, 1830.2.

Figure 20A:
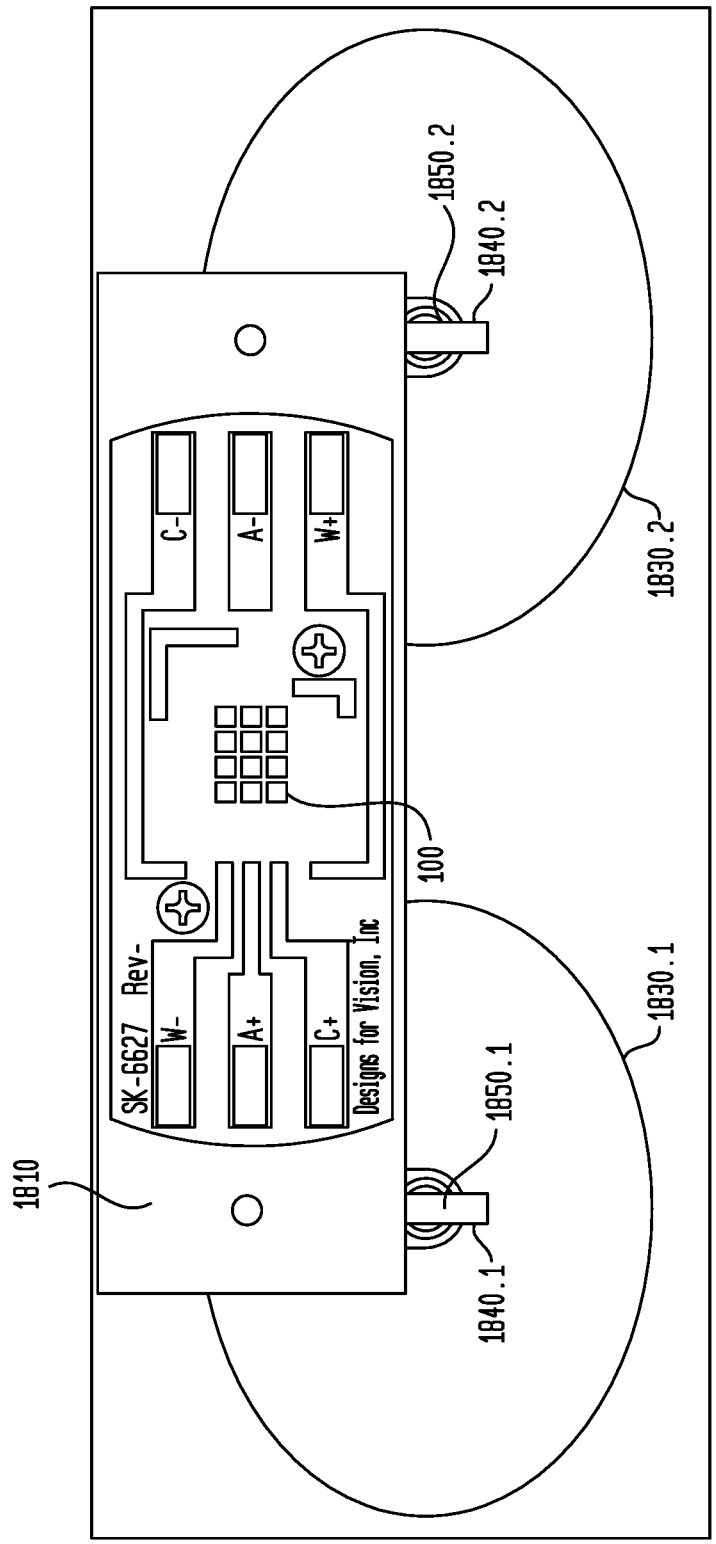
FIGS. 20A and 20B illustrate top views of the exemplary oscillating platform shown in FIG. 19.

FIG. 20A illustrates a top view of the exemplary configuration shown in FIG. 18, wherein PCB 120 is positioned in a first position caused by guiding assemblies 1840.1, 1840.2 being positioned along a minor axis of recess 1830.1, 1830.2. In this exemplary illustration PCB 120 is in an upper most position with respect to platform 1810.

Figure 20B:
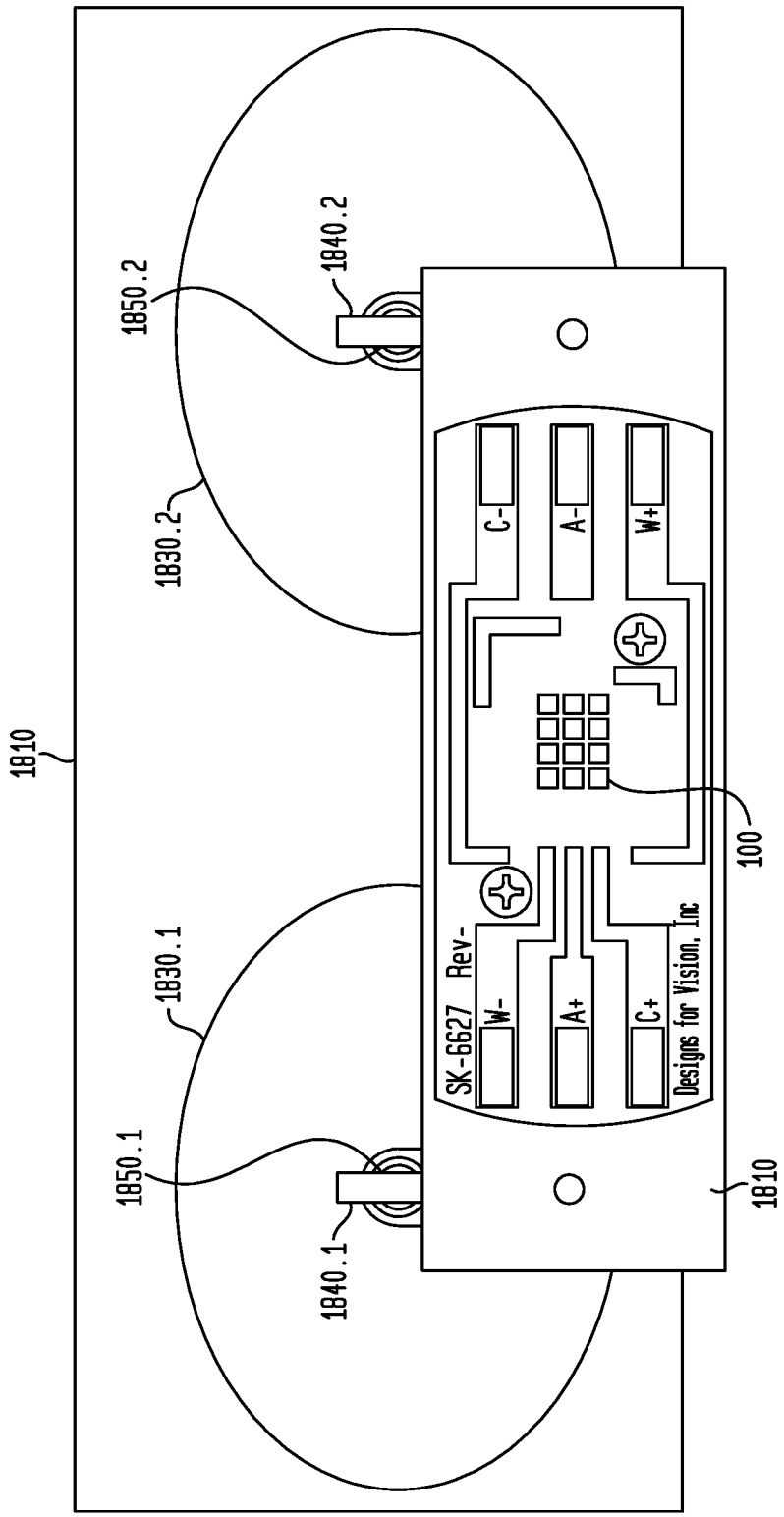

FIG. 20B illustrates a top view of the exemplary configuration shown in FIG. 18, wherein the PCB 120 is positioned in a second position caused by guiding assemblies 1840.1, 1840.2 being positioned along the minor axis of recess 1830.1, 1830.2. In this exemplary illustration PCB 120 is in a bottom most position with respect to platform 1810.

The position of PCB 120 with respect to platform 1810 would be understood to be determined based on the orientation of guiding assembly 1840.1, 1840.2, within a corresponding recess 1830.1, 1830.2, respectively.

In this exemplary embodiment, recesses 1830.1 1830.2 are shown as ellipses, possessing a major axis and a minor axis. FIGS. 20A and 20B illustrate the position of PCB 120 when guiding assemblies are positioned along a minor axis of a corresponding one of recesses 1830.1, 1830.2.

In accordance with the principles of the invention, PCB 120 is positioned proximate one of the right or left edges of platform 1810 when the guiding assembly is positioned along a major axis (see FIG. 19) in a corresponding one of recesses 1830.1, 1830.2.

In accordance with the principles of the invention, PCB 120 (and LED array 100) moves along an elliptical (or racetrack) pattern (see FIG. 4C) by guiding assembly

1840.1, 18402, as guiding assembly 1840.1, 1840.2 rotate about corresponding pins 1850.1, 1850.2.

Returning to FIG. 18, motor 1820 is shown in contact with pin 1850.1. As electrical energy (not shown) is applied to motor 1820, a shaft (not shown) of motor 1820 turns or spins. In one exemplary aspect of the invention, pin 1850.1 may represent the shaft of motor 1820 or be connected to the shaft of motor 1820. In this exemplary embodiment illustrated, the shaft of motor 1820 represents pin 1850.1 and turns as the motor shaft turns. As pin 1850.1, which is attached to attachment bracket 1843.1, begins to turn, guiding assembly 1840.1 begins to rotate within recess 1830.1.

To allow assembly 1840.1 to turn with pin 1850.1, attachment bracket 1843.1 is held in place on pin 1850.1. For example, a set screw (not shown) through attachment bracket 1843.1 locks assembly 1840.1 onto pin 1850.1.

In this illustrated example, assembly 1840.1 represents a driving assembly whereas assembly 1840.2 is a follower assembly. That is, assembly 1840.2 is not driven but is slaved to the movement of assembly 1840.1 through the connection to assemblies 1840.1, 1840.2 to PCB 120.

As a follower assembly attachment bracket 1843.2 of guiding assembly 1840.2, may loosely engage pin 1850.2 (i.e., not attached to pin 1850.2) such that bracket 1843.2 rotates about pin 1850.2.

Although it has been described that guiding assembly 1840.1 represents a driving assembly and guiding assembly 1840.2 being a follower assembly, it would be understood that the embodiment shown in FIG. 18 may be altered to have guiding assembly 1840.2 be the driving assembly and guiding assembly 1840.1 being the follower assembly.

Figure 21:
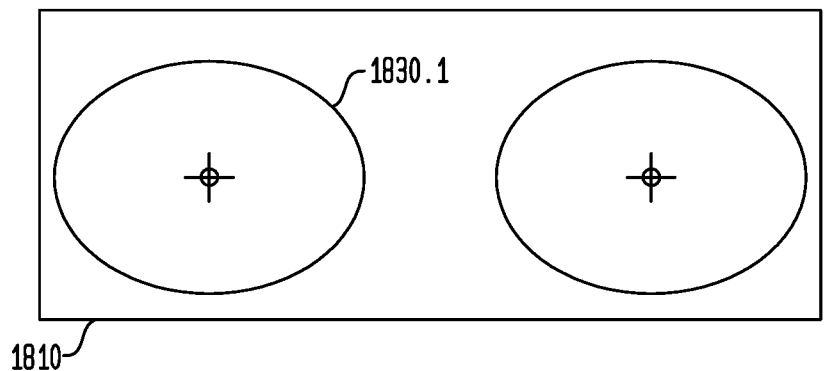
FIGS. 21-23 illustrate top views of exemplary platform configurations in accordance with the principles of the invention.
Figure 22:
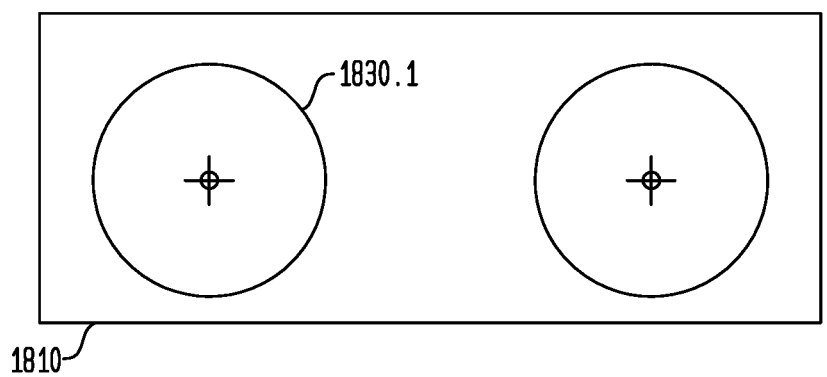
Figure 23:
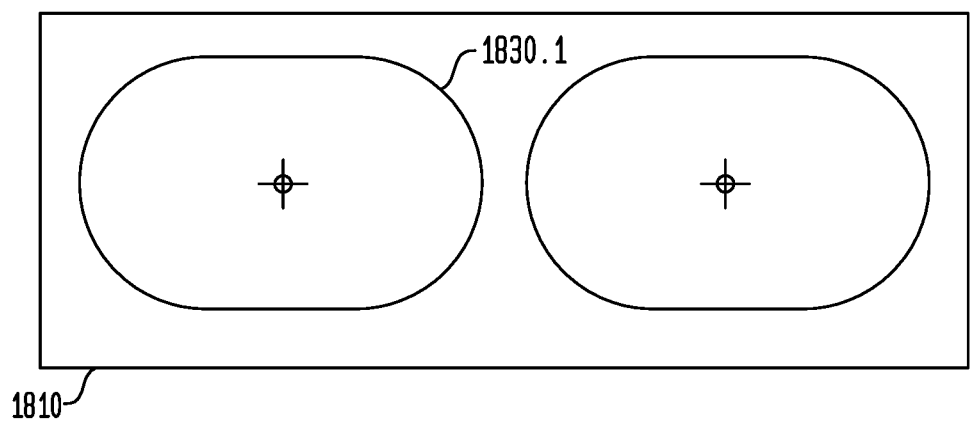

FIGS. 21-23 illustrate different exemplary configurations of recesses 1830.1 and 1830.2 in accordance with the principles of the invention.

FIG. 21 illustrates an elliptical configuration, similar to that discussed with regard to FIG. 18. FIG. 22 illustrates a circular configuration. FIG. 23 illustrates a racetrack configuration.

In each of the illustrated configurations, recesses 1830.1, 1830.2 possess a major and a minor axis. It would be understood by those skilled in the art, the specific movement of PCB 120 (i.e., vertical movement, horizontal movement, with respect to platform 1810) may be determined based on a ratio of the minor axis to the major axis.

For example, with regard to FIG. 22, wherein the major axis and the minor axis are the same (i.e., ratio 1), the movement of PCB 120 in the vertical direction is substantially similar to the movement of PCB 120 in the horizontal direction. Hence, PCB 120 moves essentially in a circular pattern.

Figure 24:
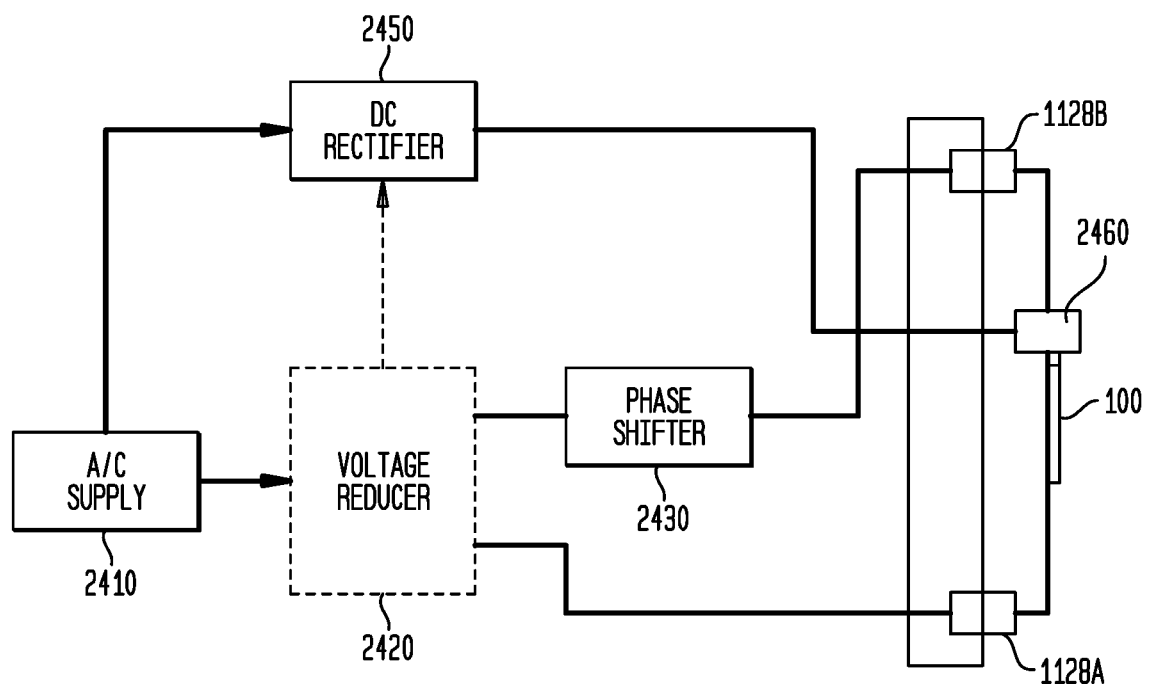
FIG. 24 illustrates a block diagram of an exemplary electrical/electronic circuitry suitable for driving LEDs in accordance with the principles of the invention.

FIG. 24 illustrates an exemplary electrical/electronic circuitry configuration in accordance with the principles of the invention.

In this exemplary circuitry, an A/C power source (e.g., mains or main power) 2410 may be applied to an optional A/C reducer circuit 2420 to reduce the inputted AC voltage. The AC voltage may then be applied to a phase shifter 2430 to alter the phase of one AC voltage with respect to another AC voltage. The AC (or reduced AC) voltages may be applied to electromagnets 1128A, 1128B, as discussed with regard to FIG. 11, for example.

Concurrently, the AC supply voltage (or the optional reduced AC voltage) may be applied to a rectifier 2450 which converts the inputted AC voltages to a DC voltage. The DC voltage may further be applied to electronic driver circuitry 2460, which is used to control the operation of the LEDs 110.1 ... 110.n by supplying power to, or removing power from, LEDs 110.1 ... 110.n on LED array 100.

The DC voltage may further be applied to a chopper circuit (not shown). The chopped DC voltage may be applied to the magnets 1128A, 1128B in place of the discussed AC voltage.

In addition, a DC voltage may be applied to a motor (see FIGS. 16, 18) for example. The DC voltage provides power to the DC motor 1603, 1820. Alternatively, the AC voltage (or the reduced AC voltage) may be applied to an AC motor to power AC motor 1603, 1820.

In summary, a lighting element is disclosed that provides for the generation, by a plurality of light emitting diodes, a substantially uniform light pattern at a known distance from the LEDs, wherein the outlines of the individual LEDs are substantially not discernible within the pattern.

The lighting element disclosed provides for the movement or the oscillation of the plurality of LEDs at a known frequency that causes a blending of the light outputted by the individual light sources (e.g., LEDs). The light from the individual light sources, when projected onto a surface is generally blended together such that the projected image is viewed as substantially uniform.

The lighting element disclosed includes at least one electromagnet that is used to control the movement or oscillation of the plurality of light sources in at least one direction.

The lighting element disclosed includes at least one gear drive mechanism that operates to move or oscillate a plurality of light sources linearly or circularly.

The lighting element disclosed incorporates a plurality of LEDS, which may be of a same color and/or a same color temperature or may be a mixture of different colors and/or of different color temperatures.

The present invention has been described with regard to a lighting arrangement that may be applied to different configurations that provide for a substantially uniform light pattern projected onto a working surface. For example, the lighting arrangement may be incorporated into overhead lights, desk lamps, etc.

Although an LED type light is contemplated and discussed with regard to the lighting element described herein, it would be recognized that other types of lighting elements may be utilized without altering the scope of the invention claimed.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. For example, any numerical values presented herein are considered only exemplary and are presented to provide examples of the subject matter claimed as the invention. Hence, the invention, as recited in the appended claims, is not limited by the numerical examples provided herein.

What is claimed is:

1. A lighting element comprising:
   at least one projection lens; and a platform, positioned within a focal length of said at least one projection lens, said platform comprising:
    a channel extending substantially a length of said platform; and
    a first electromagnet, positioned within said channel at a first end of said channel, said first electromagnet configured to:
        receive a first voltage having a varying polarity;
    a movable plate contained within said channel;
    a printed circuit board mounted on the movable plate, said printed circuit board including a plurality of light sources, wherein selected ones of said plurality of light sources outputting, concurrently, a distinctly viewable light; and
    a source configured to:
        apply said first voltage to the first electromagnet, wherein said movable plate is one of: drawn to said first electromagnet based on a first polarity of said first voltage and repelled from said first electromagnet based on a second polarity of said first voltage, wherein a frequency of said varying polarity of said first voltage is selected to view said light generated by said selected ones of said plurality of light sources through the at least one projection lens, as a single, uniformly distributed, light.

2. The lighting element of claim 1, comprising:
a second electromagnet positioned within said channel on a second end of said channel, said second electromagnet configured to:
receive a second voltage having a varying polarity, said varying polarity of said second voltage being 180 degrees out of phase from said varying polarity of said first voltage, wherein
said source is configured to:
    apply said second voltage to the second electromagnet.

3. The lighting element of claim 2, comprising:
a second magnet attached to a second end of the movable plate, said second end of said movable plate being located adjacent to the second end of the channel.

4. The lighting element of claim 1, comprising:
a first magnet attached to a first end of the movable plate, said first end of said movable plate located adjacent to the first end of the channel.

5. The lighting element of claim 1, comprising
a bridge attached to the mounting plate, said bridge spanning across the channel, said bridge including a window, wherein the plurality of light sources are viewable through the window.

6. The lighting element of claim 1, wherein the plurality of light sources comprise a plurality of LEDs (Light Emitting Diodes) selected from a group comprising: red, green, blue and white.

7. The lighting element of claim 1, wherein the plurality of light sources comprise a plurality of LEDs selected from a group consisting of: cool and warm.

8. The lighting element of claim 7, wherein the plurality of LEDs are arranged in an alternating pattern of warm LEDs and cool LEDs.

9. The lighting element of claim 1, comprising:
an aperture positioned in one of: substantially adjacent to and in contact with said plurality of light sources.

10. The lighting element of claim 9, wherein the plurality of light sources are arranged in an array, wherein
the aperture comprises:
    an opening comparable in size to the array.

11. The lighting element of claim 10, wherein the aperture is divided into a plurality of windows, each window sized comparably to a size of a corresponding one of said plurality of light sources.

12. The lighting element of claim 1, wherein the light sources are arranged in an array.

13. The lighting element of claim 1, wherein a cross-section of said channel is one of: a female dovetail and a female T-slot.

14. The lighting element of claim 13, wherein a cross-section of said mounting plate is one of: a male dovetail and a male T-slot.

15. A lighting element comprising:
a projection lens having a known focal length; and
a platform comprising:
    a channel extending substantially a length of the platform;
    a first magnet positioned within said channel at a first end of said channel; and
    a second magnet positioned within said channel at a second end of said channel;
a plate, slidably contained within the channel;
a printed circuit board mounted on the plate positioned within the known focal length of the projection lens, said printed circuit board comprising:
    a plurality of Light Emitting Diodes (LEDs), each of said plurality of LEDs configured to output a light, wherein selected ones of said plurality of LEDs are configured to output a light concurrently, said outputted light being identified with a corresponding LED; and
a first electromagnet mounted on said plate, said first electromagnet configured to:
receive a first alternating phase voltage, and
generate a magnetic field based on said received first alternating phase voltage, wherein said plate, responsive to the generated magnetic field is one of: drawn to said first magnet and repelled from said first magnet wherein a frequency of said received first alternating phase voltage is selected to cause light generated by said selected ones of said plurality of LEDs to be viewable through the projection lens, as a single, uniformly distributed, light.

16. The lighting element of claim 15, further comprising:
a second electromagnet mounted on said plate, said second electromagnet configured to:
receive a second alternating phase voltage, wherein said second alternating phase voltage is out of phase with said first alternating phase voltage.

17. The lighting element of claim 16, wherein said second alternating phase voltage is 180 degrees out-of-phase with said first alternating phase voltage.

18. The lighting element of claim 16, wherein said second alternating phase voltage is randomly selected out-of-phase with said first alternating phase voltage.

* * * * *